(12) United States Patent
Stoppe et al.

(10) Patent No.: US 11,092,794 B2
(45) Date of Patent: Aug. 17, 2021

(54) ANGULARLY-SELECTIVE ILLUMINATION

(71) Applicant: Carl Zeiss Microscopy GmbH, Jena (DE)

(72) Inventors: Lars Stoppe, Jena (DE); Michael Goegler, Wolfratshausen (DE); Thomas Ohrt, Golmsdorf (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 0 days.

(21) Appl. No.: 16/098,154

(22) PCT Filed: Apr. 26, 2017

(86) PCT No.: PCT/EP2017/059944
§ 371 (c)(1),
(2) Date: Nov. 1, 2018

(87) PCT Pub. No.: WO2017/191009
PCT Pub. Date: Nov. 9, 2017

(65) Prior Publication Data
US 2019/0146204 A1    May 16, 2019

(30) Foreign Application Priority Data

May 2, 2016   (DE) .......................... 102016108119.1
Sep. 1, 2016  (DE) .......................... 102016116311.2

(51) Int. Cl.
*G02B 21/36*    (2006.01)
*G02B 21/08*    (2006.01)
(Continued)

(52) U.S. Cl.
CPC ......... *G02B 21/367* (2013.01); *G02B 21/084* (2013.01); *G02B 21/086* (2013.01);
(Continued)

(58) Field of Classification Search
CPC .. G02B 21/367; G02B 21/084; G02B 21/086; G02B 21/088; G02B 21/14; G02B 21/26;
(Continued)

(56) References Cited

U.S. PATENT DOCUMENTS 5,038,258 A    8/1991   Koch et al.
5,808,291 A    9/1998   Nakamura
(Continued)

FOREIGN PATENT DOCUMENTS

CN    101320094 A    12/2008
CN    101566692 A    10/2009
(Continued)

OTHER PUBLICATIONS

Dong, Siyuan , et al., "Aperture-scanning Fourier Ptychography for 3D Refocusing and Super-resolution Macroscopic Imaging", Optics Express, vol. 22, No. 11, Jun. 2, 2014, 14 pages.
(Continued)

*Primary Examiner* — Oschta I Montoya
(74) *Attorney, Agent, or Firm* — Murphy, Bilak & Homiller, PLLC

(57) ABSTRACT

An optical apparatus comprises an illumination module (100) comprising a carrier (110), which has at least one light-transmissive region (112), for example. The illumination module (100) comprises a plurality of light sources (111), which are arranged on the carrier (110).

8 Claims, 26 Drawing Sheets

(51) Int. Cl.
  *G02B 21/14* (2006.01)
  *G02B 27/58* (2006.01)
  *G06T 7/55* (2017.01)
  *G06T 7/70* (2017.01)
  *G02B 21/26* (2006.01)

(52) U.S. Cl.
  CPC ........... *G02B 21/088* (2013.01); *G02B 21/14* (2013.01); *G02B 21/26* (2013.01); *G02B 27/58* (2013.01); *G06T 7/55* (2017.01); *G06T 7/70* (2017.01); *G06T 2207/10056* (2013.01); *G06T 2207/10152* (2013.01)

(58) Field of Classification Search
  CPC .. G02B 27/58; G06T 7/55; G06T 7/70; G06T 2207/10056; G06T 2207/10152
  See application file for complete search history.

(56) References Cited

U.S. PATENT DOCUMENTS

| | | |
|---|---|---|
| 5,939,705 A | 8/1999 | Nakamura |
| 6,262,802 B1 | 7/2001 | Kiyono |
| 9,068,821 B2 | 6/2015 | Fujimoto |
| 9,679,215 B2 | 6/2017 | Holz et al. |
| 9,702,977 B2 | 7/2017 | Holz |
| 10,247,933 B2 | 4/2019 | Stoppe et al. |
| 2011/0025880 A1 | 2/2011 | Nandy |
| 2012/0057013 A1 | 3/2012 | Ishiwata |
| 2012/0098950 A1 | 4/2012 | Zheng et al. |
| 2013/0016885 A1 | 1/2013 | Tsujimoto |
| 2013/0280752 A1 | 10/2013 | Ozcan et al. |
| 2013/0329120 A1 | 12/2013 | Hiasa et al. |
| 2013/0342852 A1 | 12/2013 | Fujimoto |
| 2014/0071313 A1 | 3/2014 | Hiasa |
| 2014/0118529 A1 | 5/2014 | Zheng et al. |
| 2014/0133702 A1 | 5/2014 | Zheng et al. |
| 2014/0285818 A1 | 9/2014 | Holz |
| 2014/0369558 A1 | 12/2014 | Holz |
| 2015/0087902 A1 | 3/2015 | Mertz et al. |
| 2015/0160450 A1 | 6/2015 | Ou et al. |
| 2015/0317508 A1* | 11/2015 | Zheng ................. G02B 21/365 348/80 |
| 2016/0110872 A1 | 4/2016 | Wu et al. |
| 2017/0167856 A1* | 6/2017 | Stoppe ................. G01B 11/002 |
| 2017/0242230 A1* | 8/2017 | Gareau ............... G02B 21/0076 |
| 2017/0261741 A1* | 9/2017 | Stoppe ..................... H04N 9/07 |
| 2017/0269344 A1 | 9/2017 | Kato et al. |
| 2017/0270662 A1 | 9/2017 | Kato et al. |
| 2017/0272704 A1 | 9/2017 | Kato et al. |

FOREIGN PATENT DOCUMENTS

| | | |
|---|---|---|
| CN | 103727919 A | 4/2014 |
| CN | 103905797 A | 7/2014 |
| CN | 104541194 A | 4/2015 |
| DE | 3906555 A1 | 7/1989 |
| DE | 102004012125 B3 | 9/2005 |
| DE | 102009012248 A1 | 9/2009 |
| DE | 102011054106 A1 | 4/2013 |
| DE | 102012218863 A1 | 4/2014 |
| DE | 102014109687 A1 | 1/2016 |
| DE | 102014112242 A1 | 3/2016 |
| DE | 102014112648 A1 | 3/2016 |
| DE | 102014112666 A1 | 3/2016 |
| DE | 102014113433 A1 | 3/2016 |
| TW | 201428339 A | 7/2014 |

OTHER PUBLICATIONS

Dong, Siyuan, et al., "FPscope: a Field-portable High-resolution Microscope Using a Cellphone Lens", Biomedical Optics Express, vol. 5, No. 10, Oct. 1, 2014, 6 pages.

Horstmeyer, R, et al., "Diffraction Tomography with Fourier Ptychography", Department of Electrical Engineering, Institute of Technology, Pasadena, CA, UA, 22 pages.

Chamgoulov, Ravil, et al., "Optical Computed-tomographic Microscope for Three-dimensional Quantitative Histology", Cellular Oncology 26, IOS Press, 2004, pp. 1-10.

Dowski, Edward R, et al., "Extended Depth of Field Through Wave-front Coding", Applied Optics, vol. 34, No. 11, Apr. 10, 1995, pp. 1-8.

Kawata, et al., "Optical Microscope Tomography. I. Support Constraint", Journal of the Optical Society of America, Jan. 1, 1987, pp. 1-6.

Zheng, et al., "Wide-field, High-resolution Fourier Ptychographic Microscopy", Nature Photonics, Jul. 28, 2013, pp. 1-8.

\* cited by examiner

ANGULARLY-SELECTIVE ILLUMINATION

TECHNICAL FIELD

Various embodiments relate to techniques of angle-selective illumination. Various embodiments of the invention relate to a laser scanning microscope and a microscope. In various embodiments, an illumination module for a corresponding optical apparatus comprises a carrier comprising a plurality of light sources and, optionally, at least one light-transmissive region.

BACKGROUND

DE 10 2014 112 242 A1 has disclosed techniques for illuminating a specimen from different illumination directions (angle-selective illumination or structured illumination). It is possible to determine a result image by combining the images obtained for the different illumination directions, said result image having a phase contrast, for example. Thus, digital post-processing may allow phase contrast imaging by means of the angle-selective illumination.

Sometimes, it may be difficult to combine corresponding illumination modules for angle-selective illumination with conventional optical apparatuses, such as, e.g., a laser scanning microscope (LSM) or a light microscope with an objective. This may be the case since only limited installation space is often present in such conventional optical apparatuses.

SUMMARY

Therefore, there is a need for improved implementations of illumination modules for angle-selective illumination. In particular, there is a need for corresponding illumination modules, which can be flexibly integrated into the beam path of an optical apparatus.

This object is achieved by the features of the independent patent claims. The dependent patent claims define embodiments.

According to one example, an LSM comprises a first illumination module with a laser light source. The LSM also comprises a second illumination module with a carrier and with a plurality of light sources, which are arranged on the carrier.

For such an LSM, aspects of the angle-selective illumination can be combined with laser scanning imaging.

By way of example, the LSM can be configured for fluorescence imaging. To this end, the LSM may comprise a specimen holder, for example. The specimen holder can immobilize a specimen object, such as a biological specimen or cell culture, for example, in the beam path. By way of example, the specimen object can be a phase object which brings about a significant phase change in relation to light passing therethrough. Fluorescence processes in the biological specimen can be excited by the laser light. Then, the detector can be configured to detect a corresponding fluorescence signal of the specimen object.

By way of example, the detector can be embodied as a photomultiplier (PMT). By way of example, the detector can be arranged in transmission geometry or reflection geometry, i.e., downstream (passed beam path) or upstream (reflection beam path) of the specimen holder in relation to the first illumination module. If the detector is arranged in the passed beam path, it is possible to produce a bright-field transmission image, for example.

By way of example, it is possible for the detection spectrum of the detector to differ from an emission spectrum of the laser light source. This may be the case since the fluorescence processes may bring about a conversion of the wavelength between absorbed light and emitted light. However, it would also be possible for the detection spectrum of the detector to at least partly overlap with the emission spectrum of the laser light source.

In principle, it is possible for the LSM to comprise more than one detector for detecting the fluorescence signal. By way of example, a first detector could be arranged in the passed beam path and a second detector could be arranged in the reflection beam path. By way of example, the second detector could be complemented by an Airy unit. By way of example, the second detector could be arranged downstream of a scanning optical unit of the LSM in relation to the specimen holder.

By way of example, the carrier can be arranged in a beam path defined by the laser light source. By way of example, the carrier could have an extent perpendicular to the beam path. Thus, for example, the carrier can extend in a plane that is arranged perpendicular to the beam path. However, the carrier can also extend in a plane that includes an angle of between 0° and 90° with a central ray of the beam path. Thus, the carrier can be arranged at a tilt in relation to the beam path. Here, it may be possible for the carrier also to have a certain extent (thickness) parallel to the beam path.

In exemplary implementations, it is possible for the carrier to have at least one light-transmissive region. By way of example, the at least one light-transmissive region can be embodied within an outer circumference of the carrier. In various examples, the at least one light-transmissive region can be arranged within the carrier, i.e., at a distance from external edges or a circumference of the carriers. An external circumference of the carrier can therefore include the at least one light-transmissive region.

The at least one light-transmissive region can facilitate, e.g., transmission of a significant component of light in a certain spectral range perpendicular to the carrier, i.e., along the thickness thereof. In particular, the light-transmissive region can have a transmittance that is greater than 20%, preferably >80%, particularly preferably >90%, for example. Here, in general, it is not necessary for the light-transmissive region to have a correspondingly large transmittance over a particularly large spectral range. By way of example, it would be possible for the light-transmissive region to only have a significant transmittance in a certain spectral range and only have a comparatively low transmittance in other spectral ranges.

By way of example, the beam path can pass at least partly through the at least one light-transmissive region. Thus, it would be possible for the second illumination module to be arranged in the beam path defined by the laser light source. By way of example, the second illumination module could be arranged concentrically with a central ray of the beam path.

As a result of providing the second illumination module with the light-transmissive region, techniques of angle-selective illumination can be flexibly linked to the construction of the LSM. In particular, it may be possible to arrange the second illumination module within the beam path. This is the case because what the light-transmissive region can achieve is that the beam path is not, or not significantly, modified by the second illumination module.

Here, very different techniques are possible for embodying the light-transmissive region in the carrier. The various examples described herein in relation to embodying the light-transmissive region can also be combined with one another in various scenarios.

One example relates to the implementation of the light-transmissive region as an aperture. Here, the aperture can be embodied as a through hole, for example. Expressed differently, it may be possible to implement the light-transmissive region as a recess in the material of the carrier. By way of example, the aperture can be arranged centrally on the carrier; as an alternative or in addition thereto, it would be possible for the aperture, or a further aperture, to be arranged on the carrier in off-centered fashion. If the aperture is arranged on the carrier in off-centered fashion, it is possible for the aperture—a center of the aperture, for example—to have a certain distance from the center of the carrier. Here, the center of the carrier can be defined as the geometric center of the carrier, for example. As an alternative, it would also be possible for the center of the carrier to be defined by that point of the carrier that is determined by a central ray of the beam path.

The aperture can have lateral dimensions of a plane defined by a surface of the carrier, said dimensions correlating with a beam width of the beam path in the region of the second illumination module. By way of example, the lateral dimensions of the aperture can be more than 50% of the beam width of the beam path, preferably more than 90%, particularly preferably more than 120%.

What can be achieved by implementing the light-transmissive region as an aperture is that the transmittance of the light-transmissive region of the carrier is particularly high. Moreover, the carrier can be produced easily, for example by drilling or milling.

In various examples, the aperture can remain free when arranging the second illumination module in the LSM; i.e., no further optically effective elements can be arranged within the aperture. However, it would be possible in other examples for optical elements, such as, for example, a lens, a mirror; a beam splitter; a grating, filter, etc., to be arranged at least partly within the aperture. In various examples, it is possible, for example, for the detector to be arranged at least partly in the aperture. Thus, the detector can extend at least partly in the aperture. By way of example, a sensitive area or sensor area of the detector could have a surface that is oriented parallel to the surface of the carrier. By way of example, the aperture could have lateral dimensions parallel to the surface of the carrier that correlate to the lateral dimensions of the sensitive area of the detector.

A particularly space-saving implementation can be ensured by means of such techniques. In particular, it may be possible to place the second illumination module in tight contact with the detector and thus ensure a high degree of integration.

Such an implementation of a combined second illumination module/detector may be desirable, particularly in relation to a PMT in transmission geometry, i.e., for a scenario in which the detector and the second illumination module are arranged downstream of the specimen holder in relation to the first illumination module. In this way, there can be bright-field fluorescence imaging, for example, by means of the detector.

In other examples, it is also possible for the second illumination module not to be arranged in the passed beam path but, instead, to be arranged upstream of the specimen holder in relation to the first illumination module. By way of example, the second illumination module could be arranged between a scanning optical unit of the LSM and an objective of the LSM, e.g., directly in the beam path or mirrored-in.

The scanning optical unit and the object can be arranged upstream of the specimen holder in relation to the first illumination module. In this way, an efficient illumination by the second illumination module can be achieved since it is not necessary to pass through the scanning optical unit.

By way of example, it would be possible for the second illumination module to be arranged in a region between the objective and the scanning optical unit, in which the beam width of the beam path is comparatively small—for example, in relation to other regions of the beam path between scanning optical unit and objective. By way of example, it would be possible for the second illumination module to be arranged in the region between the objective and the scanning optical unit, near or at an intermediate image plane.

It would also be possible for the second illumination module to be arranged mirrored into the beam path between the objective and the scanning optical unit. To this end, provision can be made of, for example, a partly reflective mirror as an appropriate input coupling means, said partly reflective mirror including a certain angle with the beam path. As an alternative or in addition thereto, it would also be possible to provide a dichroic filter as an input coupling means, for example if different wavelength regions are exploited.

The detector may have a detection spectrum which, at least in part, is different from an emission spectrum of the light sources of the second illumination module. What can be achieved in this manner, for example in conjunction with the fluorescence imaging, is that an illumination of the specimen object by the plurality of light sources of the second illumination module does not excite fluorescence processes, or only excites these to a small extent. What this can achieve is that the fluorescence imaging is not falsified, or not significantly falsified, by illumination by means of the light sources of the second illumination module. What this may render possible is the operation of phase-contrast imaging, too, in addition to the fluorescence imaging, without the accuracy of the fluorescence imaging being significantly reduced.

In order to carry out the phase-contrast imaging, the above-described detectors of the LSM can be used in various examples. Expressed differently, this can render it possible that, in various examples, the detector or detectors for imaging during illumination by the first illumination module are also used for imaging during illumination by the second illumination module. By way of example, a PMT thus can be used for phase-contrast imaging during illumination by the second illumination module and on the basis of techniques of angle-selective illumination. In such an example, it may be possible to dispense with the provision of a dedicated detector for techniques of angle-selective illumination; this can, in turn, reduce the required installation space.

However, in other examples, it is also possible for the LSM to comprise a further detector. The further detector can be arranged in such a way that it can be used for techniques of angle-selective imaging. By way of example, the further detector may have a comparatively high resolution, for example in comparison with a PMT. In particular, the further detector can be arranged in such a way that it can be used for imaging in the case of illumination of the specimen object by the second illumination module. If the further detector need not detect any fluorescence signals, a sensitivity of the further detector can be comparatively low, for example in comparison with a PMT. Here it is possible, for example, for the further detector to have a detection spectrum that at least partly overlaps with the emission spectrum of the light sources of the second illumination module. By way of example, it would be possible for the further detector to comprise a CCD sensor. As an alternative or in addition thereto, it would be also possible for the further detector to comprise a CMOS sensor. By way of example, the further detector can be operated as a camera. By the provision of the further detector, it is possible to implement an image capture that is optimized in relation to phase-contrast imaging.

In various examples, the further detector can be positioned at very different positions. In particular, the positioning of the further detector can vary depending on the positioning of the second illumination module. In principle, it would be possible to operate the further detector in transmission geometry or in reflection geometry in relation to the second illumination module and the specimen holder. In one example, it would be possible for the further detector to be arranged between the scanning optical unit and the objective. By way of example, it would be possible for the further detector to be arranged in the region of an intermediate image plane. By way of example, a beam splitter may be provided for the further detector such that a corresponding beam path is mirrored-in.

In further examples, a microscope comprises an objective and a detection beam path. The detection beam path extends through the objective. The microscope also comprises an illumination module with a carrier. The carrier has at least one light-transmissive region. The illumination module comprises a plurality of light sources, which are arranged on the carrier.

For such a microscope with an illumination module, it is possible to obtain effects that are comparable to the effects that can be obtained for the above-discussed LSM. In particular, it may be possible, once again, to integrate the illumination module into the microscope in a particularly space-saving manner. As a result, it may be possible, in turn, to flexibly vary the position of the illumination module.

By way of example, it would be possible for the carrier to be arranged in the detection beam path. In the process, it would be possible for the carrier to have an extent transverse to the detection beam path, for example. In this way, there can be a very particularly space-saving integration of the illumination module into the microscope.

The microscope may also comprise a camera that defines a further beam path. The further beam path can be at least partly different from the detection beam path. The carrier can have an extent transverse to the further beam path.

By way of example, the microscope can be on optical transmitted-light microscope or reflected-light microscope with a conventional design, i.e., for example, comprise a lens turret with a plurality of objectives, one or more eyepieces in the detection beam path, one or more detectors in the detection beam path and/or a trinocular tube. By way of example, the microscope may also comprise a further illumination module. Here, the further illumination module may comprise, for example, a daylight attachment mirror, one or more halogen lamps, one or more mercury high-pressure lamps and/or one or more light-emitting diodes as a light source. The further illumination module may comprise a condenser that images a radiant field stop onto the specimen object and that assists the resolution of the microscope with its numerical aperture. However, it is also possible for the microscope to comprise no further illumination module. By way of example, the illumination module with the plurality of light sources can also be used for conventional imaging. In further examples, use can also be made of a purely digital microscope, which, for example, does not have an eyepiece.

By way of example, the detection beam path can be used to provide one or more detectors that image a specimen object arranged on a specimen holder of the microscope with magnification. To this end, the microscope could comprise one or more eyepieces or detectors, for example.

By way of example, it would be possible for the further beam path to be completely different from the detection beam path. By way of example, it would be possible for the detection beam path to extend on one side of a specimen holder of a microscope while the further beam path extends on the opposite side of the specimen holder. However, the further beam path may also, in part, extend parallel to the detection beam path. By way of example, it would be possible for the further beam path to be mirrored-in to the detection beam path. By way of example, a partly reflective mirror and/or a dichroic filter can be provided to this end.

In one example, it is possible for the further beam path to also extend through the objective. In such an example, the further beam path typically also defines a comparatively large magnification of the specimen object. In another example, it would however also be possible for the further beam path not to extend through the objective. In such an example, the further beam path can define a comparatively low magnification of the specimen object, for example. In this way, the further beam path can facilitate the production of an overview image of the specimen object, for example.

By way of example, it would be possible for the detection beam path to define a first magnification of the specimen object while the further beam path defines a second magnification of the specimen object in relation to the camera. Here, the second magnification can be less than the first magnification. In this way, it may be possible to produce an overview image by means of the camera. By way of example, the overview image can image substantial regions of the specimen holder. By way of example, the second magnification could be dimensioned in such a way that the overview image images more than 50%, preferably more than 80%, particularly preferably more than 100% of the specimen holder. In the case of a sufficiently small magnification, it is possible to image a holding frame of the specimen holder, for example, and the latter can be used for orientation purposes. By means of an image produced by the camera, it may then be possible to undertake rough positioning and/or fine positioning by adjusting the specimen holder.

It is also possible to apply the techniques for forming the light-transmissive region, described above, to the illumination module of the microscope. Here, it would be possible, for example, for the light-transmissive region to be formed by an aperture, e.g., by an aperture arranged in off-centered or centered fashion on the carrier.

By way of example, if the aperture is arranged in off-centered fashion, the aperture can have a distance from a center of the carrier. By way of example, the center of the carrier—as already described above in relation to the LSM—can be defined geometrically and/or in relation to a central ray of the beam path. In such an example of the off-centered arrangement of the aperture, it may be possible for at least one of the light sources of the illumination module to be arranged between the center of the carrier and the light-transmissive region.

In particular, this may render it possible to arrange one or more light sources of the illumination module particularly centrally. This can promote bright-field imaging by the microscope. As a result, it may be possible, for example, for the illumination of the specimen object by the centrally arranged one or more light sources to be collected by a stop of the objective. Expressed differently, this may render it possible for direct light of the centrally arranged one or more light sources to penetrate into the objective.

At the same time, it may be desirable for a distance between the center of the carrier and the light-transmissive region to have comparatively small dimensions—for example, under the boundary condition of the bright-field imaging explained above. In particular, it may be possible for the distance between the light-transmissive region and the center of the carrier to correspond to a projection of a stop aperture of the objective on the carrier. This can ensure a particularly high transmittance of light through the light-transmissive region.

In various examples, it is possible for the aperture to remain free; i.e., no optical elements are arranged in the region of the aperture. However, it would also be possible for the camera to be arranged in the aperture, at least in part. By way of example, a sensor area of the camera can be arranged parallel to a surface of the carrier. By way of example, it would be possible for an imaging optical unit of the camera to be arranged in the aperture, at least in part. By way of example, the imaging optical unit may comprise at least one element selected from the following group: a lens element; a grating; a filter; a mirror; and a beam splitter. In this way, there can be a particularly space-saving integration of the illumination module into the microscope.

The various light sources can be actuatable in a separated or separate manner. By way of example, this means that the various light sources—if necessary—can be operated by separate control signals. In the examples described herein, different light sources can be used for implementing the angle-selective illumination. By way of example, the light sources can be selected from the following group: organic light-emitting diodes; solid-state light-emitting diodes; light-emitting diodes; halogen light sources; and laser diodes. Here it is possible, for example, for organic light-emitting diodes and halogen light sources to have a greater lateral dimension parallel to a surface of the carrier than the light-emitting diodes. By providing the at least one light-transmissive region, it is possible to obtain flexibility in relation to the light sources arranged outside of the at least one light-transmissive region.

In one example, the light sources could be arranged in a circular or ring-shaped manner.

By way of example, the light sources can be arranged in a matrix structure, i.e., with one-dimensional or two-dimensional periodicity within a plane defined by a surface of the carrier. The matrix structure can correspond to grating structure of the arrangement. Here, the matrix structure can define a square, rectangular or polygonal unit cell of the corresponding grating structure, for example. By using the matrix structure, it is possible to use a particularly flexible angle-selective illumination. In this way, it is possible to implement particularly meaningful phase-contrast imaging.

By way of example, it would be possible for the light sources to be arranged on a dome-shaped surface of the carrier (illumination dome).

In various examples, the distance between adjacent light sources for the angle-selective illumination can vary. By way of example, it would be possible for the light sources to be arranged on a surface of the carrier with a geometric fill factor that is no greater than 90%, preferably no greater than 50%, particularly preferably no greater than 30%. As a result, it may be possible for particularly little light incident on the carrier to be absorbed or reflected by the light sources.

By way of example, it would be possible for the carrier to be formed from light-transmissive material, for example a solid-state material, at least in the light-transmissive region. By way of example, the carrier could be formed from glass, at least in the light-transmissive region. By way of example, the carrier could be formed from a transparent plastic film, at least in the light-transmissive region. By way of example, the various light sources could be arranged on different webs of the plastic film. What can be achieved by using the light-transmissive material, particularly in conjunction with a comparatively low geometric fill factor, with which the light sources are arranged on the surface of the carrier, is that the light-transmissive region is formed between two adjacent light sources in each case and dimensioned to be relatively large. What this can achieve is that particularly little light of the beam path incident on the surface of the carrier is reflected or absorbed.

By way of example, it would be possible for the light sources to be arranged more rotationally symmetric in relation to a centrally arranged axis that is perpendicular to a surface of the carrier. By way of example, different light sources could have a different distance from the axis. As a result of this, it may be possible to implement the light-transmissive region in a central region of the carrier. In particular, it may be possible to dimension the light-transmissive region to be comparatively large. Moreover, the techniques of angle-selective illumination may be implemented particularly efficiently by means of such a rotationally symmetric arrangement of the light sources.

In one example, it would be possible for the light sources to be arranged on the carrier outside of the light-transmissive region. In such an example, the light-transmissive region can be embodied by a different element to the light sources, for example, as described above, by an aperture, a light-transmissive solid-state material, etc.

However, in a further example, it would also be possible for the light sources to at least partly form the at least one light-transmissive region. By way of example, the light sources could be implemented as organic light-emitting diodes, which are light-transmissive. As a result of this, it may be possible, on the one hand, to implement a particularly large at least one light-transmissive region; on the other hand, a particularly flexible arrangement of the light sources is possible at the same time.

Such above-described microscopes or laser scanning microscopes can be used, in general, for angle-selective illumination. As a result, it may be possible to produce a phase contrast image of an object (result image). It would also be possible to implement autofocus applications.

In the case of the angle-selective illumination, the light sources can be actuated separately and/or sequentially for the purpose of producing light. As a result, illuminating an object can be implemented from a plurality of illumination directions. Here, illuminating the object from a certain illumination direction may comprise the actuation of at least one light source of the illumination module. A separation of the imaging of the object into corresponding measurement images for the different illumination directions can be implemented by the separate and/or sequential actuation of the light sources. In the case of the sequential illumination of the object, the various measurement images can also be captured in sequence; as a result, a separation of the illumination directions over time is brought about. As an alternative or in addition thereto, a separation of the illumination directions can also be obtained by using different spectral regions of the light for different illumination directions. As an alternative or in addition thereto, a separation of the illumination directions can also be obtained by using different polarizations of the light for the different illumination directions. In such cases, corresponding measurement images can also be captured at least partly parallel in time; the separation can be implemented by holding up appropriate color filters and/or polarization filters. Single shot measurements may be possible.

By way of example, a corresponding laser scanning microscope or a corresponding microscope could comprise a computing unit. The computing unit may be configured to actuate the plurality of light sources to separately and/or sequentially illuminate an object from a plurality of illumination directions.

In one example, it would be possible, for example, for the computing unit to be configured to actuate the plurality of light sources for separate illumination of the specimen object from the plurality of illumination directions with appropriate light, the light from different illumination directions having different wavelengths and/or polarization. As a result, it may be possible to implement single shot measurements: in particular, it may be possible for the computing unit to be configured to actuate the plurality of light sources for illuminating the specimen object from the plurality of illumination directions at least partly parallel in time.

It is possible to also use angle-selective illumination for further fields of application. By way of example, DE 10 2014 109 687 A1 has disclosed techniques for determining the z-position of the specimen object, i.e., parallel to the optical axis, on the basis of angle-selective illumination: the corresponding disclosure is incorporated herein by cross-reference.

By way of example, it would be possible in this context for the computing unit to be configured to actuate at least one first light source of the plurality of light sources for illuminating the specimen object from a first illumination direction with first light and to capture a first image by means of at least one detector during the illumination from the first illumination direction. Furthermore, the computing unit can be configured to actuate at least one second light source of the plurality of light sources for illuminating the specimen object from a second illumination direction with second light and to capture a second image by means of the at least one detector during the illumination from the second illumination direction. Then, the computing unit can be configured to determine a distance between imaging locations of the specimen object in the first image and in the second image.

Here, the computing unit can be configured, in particular, to actuate the plurality of light sources for illuminating the specimen object from the first illumination direction and from the second illumination direction at least partly parallel in time. In order to facilitate a separate illumination or an option for separating the first light and the second light, the first light and the second light can have different wavelengths and/or polarizations.

In one example, the computing unit can be configured to determine a position of the specimen object parallel to the optical axis on the basis of the distance. By means of such techniques, it is thus possible to determine the position of the specimen object comparatively quickly—for example, in a single shot measurement.

This can be used for autofocus applications, for example. In this respect, it would be possible, for example, for a motor to be present: the corresponding motor can be configured to displace the focal plane of the microscope in relation to the specimen holder. To this end, the motor can be configured, for example, to position the specimen holder parallel to the optical axis. As an alternative or in addition thereto, the specimen holder could also be positioned at the objective, at the lens turret, the camera and/or a lens element, etc. Then, the computing unit can be configured to actuate the motor on the basis of the determined distance between the imaging locations of the specimen object in the first image and the second image.

By means of such techniques, it may be possible to implement fast autofocus applications, for instance in real time. By way of example, a control loop could be implemented by means of an appropriate technique, said control loop causing the specimen object to be continuously held in the focus of the microscope during the course of a measurement series. To this end, it may be possible for capturing the first image and the second image for different illumination directions and correspondingly establishing the distance between the imaging locations of the specimen object to be carried out repeatedly during the measurement series. By way of example, this may be carried out in nested fashion with the measurement series.

Different techniques can be used to separate the light with different wavelengths and/or different polarization. It may be possible in various examples for this separation to be implemented by one or more detectors themselves. By way of example, a detector could comprise a plurality of groups of pixels, which each have different sensitivities in relation to wavelengths and/or polarizations of light. If different sensitivities for different wavelengths are intended to be implemented, use can be made of an RGB sensor, for example. By way of example, the RGB sensor can comprise an array of pixels, wherein the pixels of a first group have a sensitivity in the red spectral range, the pixels of a second group have a sensitivity in the green spectral range and the pixels of a third group have a sensitivity in the blue spectral range. By way of example, the pixels of the RGB sensor could be arranged in a so-called Bayer scheme. Here, more pixels of the second group with the sensitivity in the green spectral range can be present, for example, than corresponding pixels of the first group and the third group. Then, it may be possible for the captured images to be determined in each case on the basis of a single group of pixels of the RGB sensor.

Corresponding techniques also become appliable in relation to the separate encoding by means of polarization. By way of example, a detector could comprise a plurality of groups of pixels, with the different groups each being associated with different sensitivities in relation to the polarization of light. By way of example, the detector could have a sensor in which—analogously to a Bayer scheme for RGB sensors—different orientations of the polarization of light can be detected by means of adjacent pixels and, optionally, each second pixel has a sensitivity for the same orientation of the polarization.

In order to obtain corresponding sensitivities in relation to the wavelengths and/or polarizations of light, use can be made of filters, for example.

As an alternative to separation of the light with different wavelengths and/or different polarizations by the one or more detectors themselves, it would also be possible for one or more spectral elements also to be provided in addition to the plurality of—e.g., non-wavelength- and/or non-polarization-selective—detectors. Here, the at least one spectral element can be configured to produce a plurality of partial beam paths, assigned to the detectors, by the separation of light in relation to wavelengths and/or polarizations. Then, it would be possible for the different partial beam paths to be respectively led to the different detectors.

Here, different spectral elements can be used. By way of example, the at least one spectral element could be selected from the following group: beam splitter; dichroic element; color filter; polarization filter; grating; filter wheel; and prism.

If the separation of the light is brought about by the at least one spectral element, it may be possible to use particularly cost-effective and/or space-saving and/or particularly few complex detectors. By way of example, it would be possible to use monochrome cameras as detectors. Then, the selection in relation to light can be made by the at least one spectral element.

By way of example, a filter wheel may comprise a plurality of rotating filter disks. The filter disks can implement color filters and/or polarization filters. Then, for example, a single detector or a plurality of detectors can be actuated or read in time synchronized fashion with the rotation of the filter disk.

Various techniques in relation to the separation of the light with different wavelengths and/or different polarizations for detection purposes were described above. Corresponding techniques can also be used to produce light with different wavelengths and/or different polarizations.

By way of example, it would be possible to use RGB light sources. By way of example, the light sources of a first group could have a maximum of the intensity of the emitted light in the red spectral range, the light sources of a second group could have a maximum of the intensity of the emitted light in the green spectral range and the light sources of a third group could have a maximum of the intensity of the emitted light in the blue spectral range. By way of example, the light sources could be arranged in a scheme corresponding to the Bayer scheme for RGB sensors.

Corresponding techniques can also be appliable in relation to the separate encoding of the light by means of polarization. By way of example, the light sources of different groups could each be associated with different orientations of the polarization of the produced light. By way of example, the light sources could be arranged in an analogous fashion to a Bayer scheme for RGB sensors, and so adjacent light sources have different orientations of the polarization of the produced light and, optionally, each second light source has the same orientation of the polarization of the produced light.

As an alternative to separately producing light with different wavelengths and/or different polarizations by different light sources themselves, it would be also possible for one or more spectral elements to be provided. Here, the at least one spectral element can be configured to encode a plurality of partial beam paths, assigned to the different light sources, in respect of the wavelength and/or polarization. Here, different spectral elements can be used. By way of example, the at least one spectral element could be selected from the following group: beam splitter; dichroic element; color filter; polarization filter; filter wheel; and prism.

According to a further example, an illumination module comprises a carrier. The carrier has a light-transmissive region. The illumination module also comprises a plurality of light sources, which are arranged on the carrier.

According to a further example, an illumination module comprises a carrier, a plurality of light sources, which are arranged on the carrier, and at least one detector, which is applied to the carrier. By way of example, an emission spectrum of the plurality of light sources can be at least partly overlapping with a detection spectrum of the at least one detector. By way of example, it would be possible for the at least one detector to be attached centrally or in off-centered fashion on the carrier.

Here, it would be possible for the at least one detector to have a distance from a center of the carrier and for at least one light source of the module to be arranged between the center of the carrier and the at least one detector.

In one example, a method comprises the following for each of a plurality of illumination directions: illuminating a specimen object from the corresponding illumination direction and with corresponding light, and capturing an associated measurement image of the specimen object during the illumination. Here, the light from different illumination directions has different polarizations. Furthermore, the method comprises combining initial images, based on the captured measurement images, in the image space for the purpose of producing a phase-contrast image of the specimen object.

In a further example, a method comprises illuminating a specimen object from a first illumination direction with first light and capturing a first image during the illumination from the first illumination direction. The method furthermore comprises illuminating the specimen object from a second illumination direction with second light and capturing a second image during the illumination from the second illumination direction. The method furthermore comprises determining a distance between imaging locations of the specimen object in the first image and in the second image. The illumination of the specimen object from the first illumination direction and from the second illumination direction, at least in part, can occur parallel in time. The first light and the second light have different wavelengths and/or polarizations.

The features set out above and features that are described below may be used not only in the corresponding combinations explicitly set out, but also in further combinations or in isolation, without departing from the scope of protection of the present invention. By way of example, examples relating to the different illumination modules could be combined with examples relating to the LSM and the microscope.

BRIEF DESCRIPTION OF THE FIGURES

The properties, features and advantages of this invention described above and the way in which they are achieved will become clearer and more clearly comprehensible in association with the following description of the exemplary embodiments which are explained in greater detail in association with the drawings.

DETAILED DESCRIPTION OF EMBODIMENTS

Figure 1:
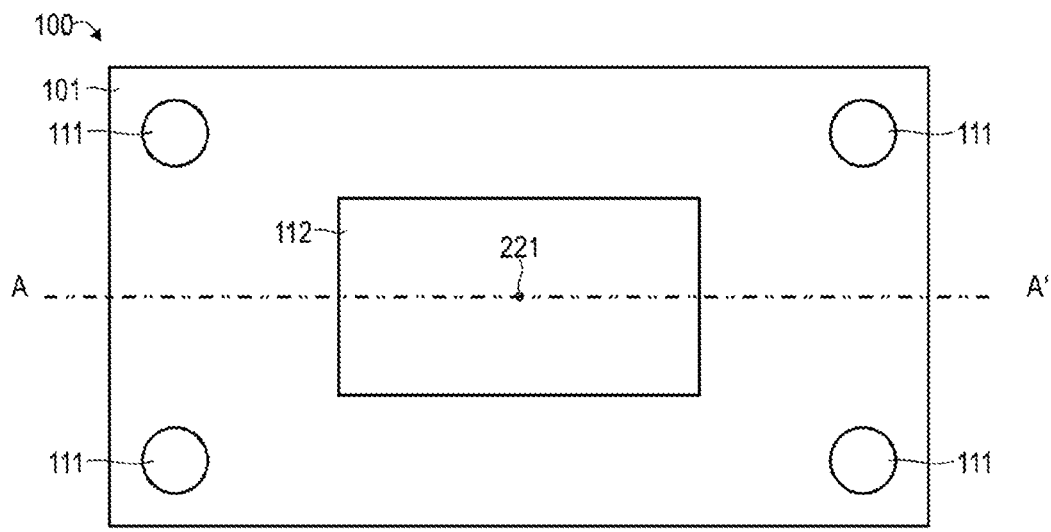
FIG. 1 is a schematic plan view of an illumination module for angle-selective illumination and with a carrier, which has a light-transmissive region according to various embodiments.

The present invention is explained in greater detail below on the basis of preferred embodiments with reference to the drawings. In the figures, identical reference signs designate identical or similar elements. The figures are schematic representations of different embodiments of the invention. Elements illustrated in the figures are not necessarily depicted as true to scale. Rather, the different elements illustrated in the figures are reproduced in such a way that their function and general purpose become comprehensible to the person skilled in the art.

Below, techniques are described in relation to an illumination module, which can be used for the angle-selective illumination of a specimen object. The illumination module comprises a plurality of light sources, which are arranged at a distance from one another, and thus can implement illumination of a specimen object from a plurality of illumination directions. Different polarizations are assigned to the different illumination directions. Then, measurement images, which correspond to the individual illumination directions, can be combined with one another. As a result, a result image can be obtained by digital post-processing, said result image having a phase contrast.

Here, various examples relate to the particularly flexible combination of such an illumination module for angle-selective illumination with optical apparatuses of different configuration. Various examples describe how such an illumination module can be combined with an LSM. Further examples describe how such an illumination module can be combined with a reflected-light microscope or a transmitted-light microscope.

By way of example, different examples describe how such an illumination module can be combined with a laser light source of an LSM. Here, the illumination module could be structurally connected or coupled to a PMT that is arranged in transmission geometry and configured to detect a fluorescence signal of a corresponding specimen object. To this end, the illumination module can have a light-transmissive region, for example, through which light can pass to the detector. By way of example, the illumination module could be implemented by a carrier with a centrally arranged recess/aperture as a light-transmissive region; then it can be possible to at least partly arrange the PMT in the aperture. Here it is also possible, for example, for the emission spectrum of the light sources of the illumination module to differ from the detection spectrum of the PMT. Here, the detection spectrum of the PMT can be matched to the wavelength of a laser light source and/or to the wavelength of a fluorescence signal; by way of example, the emission spectrum of the light sources of the illumination module can lie in the infrared spectral range.

In further examples, it would be possible, for example, for the illumination module to have a perforated carrier, wherein no further optical elements are arranged in the aperture or apertures. In other examples, different optical elements can be arranged in the region of the at least one aperture, for example, a lens, a Bertrand lens with angle-selective shadowing, a grating, etc.

In various examples, it may be possible to combine the illumination module with an optical microscope. Here, the illumination module can be arranged in a detection beam path or in a further beam path of the illumination module, for example, wherein the further beam path can at least partly differ from the detection beam path. In various examples, it is possible to combine such an illumination module with an overview camera. By way of example, the overview camera can be configured to capture an overview image of a specimen holder of the microscope. A corresponding beam path that is associated with the camera can therefore have a comparatively low magnification.

By way of example, the microscope can be a conventional reflected-light microscope or transmitted-light microscope. Such techniques can be applied, in particular, in conjunction with wide-field microscopy, in which an overview image of a specimen object is created and fine positioning takes place on the basis of the overview image. The individual configuration and arrangement of the light sources of such an illumination module for angle-selective illumination can vary in different examples. By way of example, an LED array could be used as a corresponding matrix structure. In other examples, use could also be made of light sources with a comparatively large lateral extent, such as halogen light sources or organic light-emitting diodes, for example. By way of example, these could be arranged in different quadrants on the carrier in relation to a centrally arranged aperture, which forms the light-transmissive region. Optionally, it is also possible for organic light-emitting diodes themselves to have a light-transmissive configuration and thus implement the light-transmissive region.

The illumination module having a light-transmissive region can be dispensed with in various examples. By way of example, the illumination module could have a continuous carrier, which is not light-transmissive, in such examples. By way of example, it would be possible here for the at least one detector to be applied, for example adhesively bonded, to the carrier. By way of example, the detector could be applied centrally or in off-centered fashion on the carrier.

Different effects can be obtained by means of such techniques. By way of example, it may be possible to combine different imaging techniques with one another. By way of example, conventional, analog imaging techniques—such as analog, optical reflected-light microscopy or analog, optical transmitted-like microscopy or fluorescence imaging, for example—can be combined with techniques that are based on digital post-processing. Moreover, it is possible to combine fluorescence imaging techniques with techniques from non-fluorescence imaging. By way of example, digital techniques in conjunction with angle-selective illumination—as described in conjunction with DE 10 2014 112 242 A1—may facilitate a fully automatic or at least partly automatic production of a fitting contrast. The corresponding disclosure, in the entirety thereof, is incorporated herein by cross-reference. Therefore, such techniques can also be implemented without in-depth expert knowledge. Particularly in conjunction with the fluorescence imaging, using suitable emission spectra of the light sources of the illumination module renders it possible to avoid biological specimen objects being used up by the techniques of angle-selective illumination and thus adversely affecting the fluorescence imaging.

Moreover, it is possible to implement optical apparatuses which, as described above, combine different imaging techniques but use a common objective to this end. This saves installation space and reduces costs and complexity. By way of example, by means of the techniques of angle-selective illumination, it may be possible to produce phase-contrast images; here, the provision of a specific differential phase-contrast (DIC) optics or Zernike optics may be dispensed with.

FIG. 1 illustrates an exemplary illumination module 100. FIG. 1 is a plan view of the illumination module 100. The illumination module 100 comprises a carrier 101. By way of example, the carrier 101 can be configured as a solid plate. The carrier 101 can be formed from transparent material, i.e., light-transmissive material, such as glass or plastic, for example, or else it can be formed from non-light-transmissive material. By way of example, the carrier 101 could be produced from metal, for example steel or aluminum. The carrier can be embodied as a plate.

In the example of FIG. 1, a total of four light sources 111 are arranged on the carrier 101 in a manner offset in relation to a geometric center, which corresponds to an axis 221. The light sources 111 are arranged in different directions in relation to the axis 221. In particular, the light sources 111 are arranged in different quadrants in relation to the axis 221. By way of example, the light sources 111 can be implemented by way of light-emitting diodes. Other types of light sources 111 can also be used. It is evident from FIG. 1 that the light sources 111 are arranged at different positions in relation to the geometric center of the carrier 101. As a result, the angle-selective illumination can be implemented, for example in a scenario in which the central axis 221 extends along a central ray of a beam path of an optical apparatus, which receives the illumination module 100. In particular, the light sources 111 are arranged more rotationally symmetric in relation to the central axis 221. This may be expedient if the angle-selective illumination should be implemented for very different directions, for example in order to produce a particularly strong phase contrast.

A light-transmissive region 112 is arranged in the region of the geometric center of the carrier 101. In principle, the light-transmissive region 112 is optional. In one example, the light-transmissive region 112 can be implemented by light-transmissive solid material; examples of light-transmissive material would be, for example: glass; plastic; plastics film; etc. By way of example, the light-transmissive material can be embedded in the surrounding material of the carrier 101 and can be securely connected to the latter. By way of example, the light-transmissive region 112 could be implemented as a glass plate, which is embedded in the metallic carrier. In a further example, the light-transmissive region 112 can be implemented by a cutout or an aperture.

While a single, contiguous light-transmissive region 112 is illustrated in relation to the example of FIG. 1, the provision of more than one light-transmissive region may be possible in other examples. By way of example, a plurality of apertures that are separated from one another could be provided. Here, appropriate techniques, as explained above in relation to FIG. 1, can be applied.

What can be achieved as a result of the light-transmissive region is that the illumination module 100 can be combined particularly flexibly with an optical apparatus. By way of example, it may be possible for the illumination module 100 to be arranged within the beam path of the optical apparatus; then, light can pass through the light-transmissive region 112 along the beam path through the illumination module 100. In this way, the illumination module 100 can be flexibly integrated into the optical apparatus.

Figure 2:
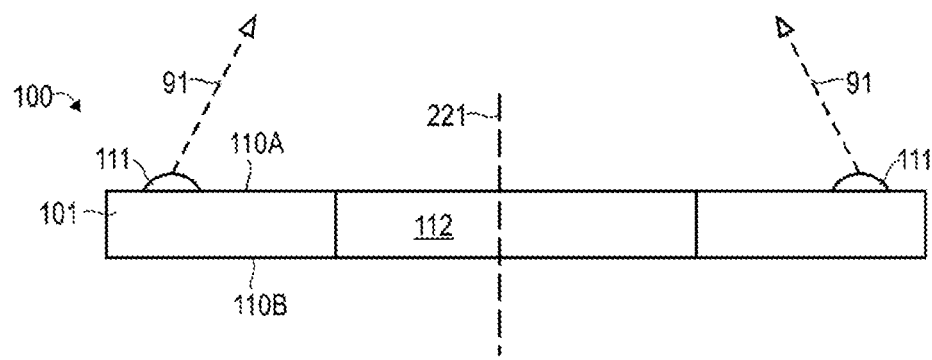
FIG. 2 is a schematic side view of the illumination module for angle-selective illumination according to FIG. 1.

FIG. 2 is a lateral sectional view of the illumination module 100 from FIG. 1 along the dash-dot-dotted line A-A' in FIG. 1. In FIG. 2, the surfaces 110A, 110B of the carrier 101 are illustrated. FIG. 2 illustrates, in particular, an upper side 110A and a lower side 110B of the carrier 110. The upper side 110A and the lower side 110B have a plane embodiment; in other examples, these could also have a non-planar form.

It is evident from FIG. 2 that, for example, light incident from above or below can pass along the central axis 221 through the illumination module 100 in the region of the light-transmissive region 112 without significant reflection or absorption. Therefore, it is possible to combine illumination module 100 flexibly with different optical apparatuses such as, for example, an LSM or a conventional reflected-light microscope or transmitted-light microscope. In particular, it may be possible to arrange illumination module 100 in the beam path of an optical apparatus.

FIG. 2 also illustrates the illumination directions 91 respectively associated with the light sources 111.

Figure 3:
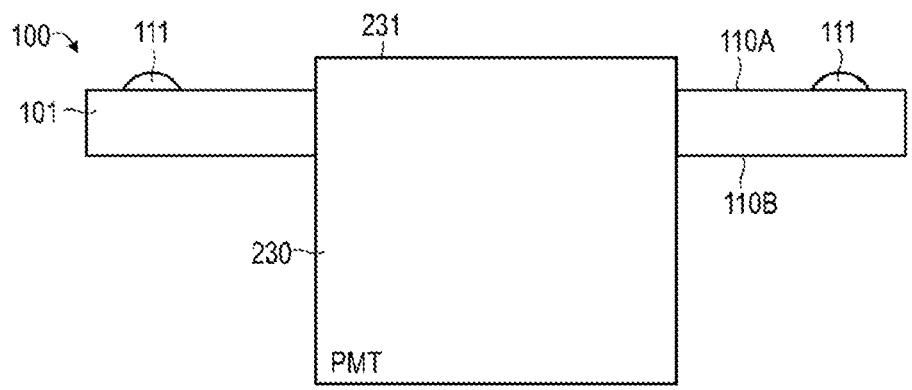
FIG. 3 is a schematic side view of the illumination module for angle-selective illumination according to FIG. 1, wherein, in the example of FIG. 3, a detector is partly arranged in the aperture.

FIG. 3 illustrates aspects in respect of the arrangement of a detector 230 in the light-transmissive region, which is embodied as an aperture that is arranged centrally on the carrier 110. In one example, in which the light-transmissive region 112 is embodied as an aperture, it is possible to at least partly arrange other optically effective elements, such as, e.g., a detector 230, in the aperture. Such a scenario is shown in FIG. 3. In the example in FIG. 3, a PMT, which may be configured, for example, to detect a fluorescence signal in a biological specimen object, is arranged in the region of the aperture, which implements the light-transmissive region 112. In particular, a sensitive area 231 of the detector 230 is spaced apart from the upper side 110A; this means that the detector 230 projects beyond the upper side 110A along the axis 221. What this can achieve is that light incident from above can be detected by the detector 230 without great losses on account of the illumination module 100.

Figure 4:
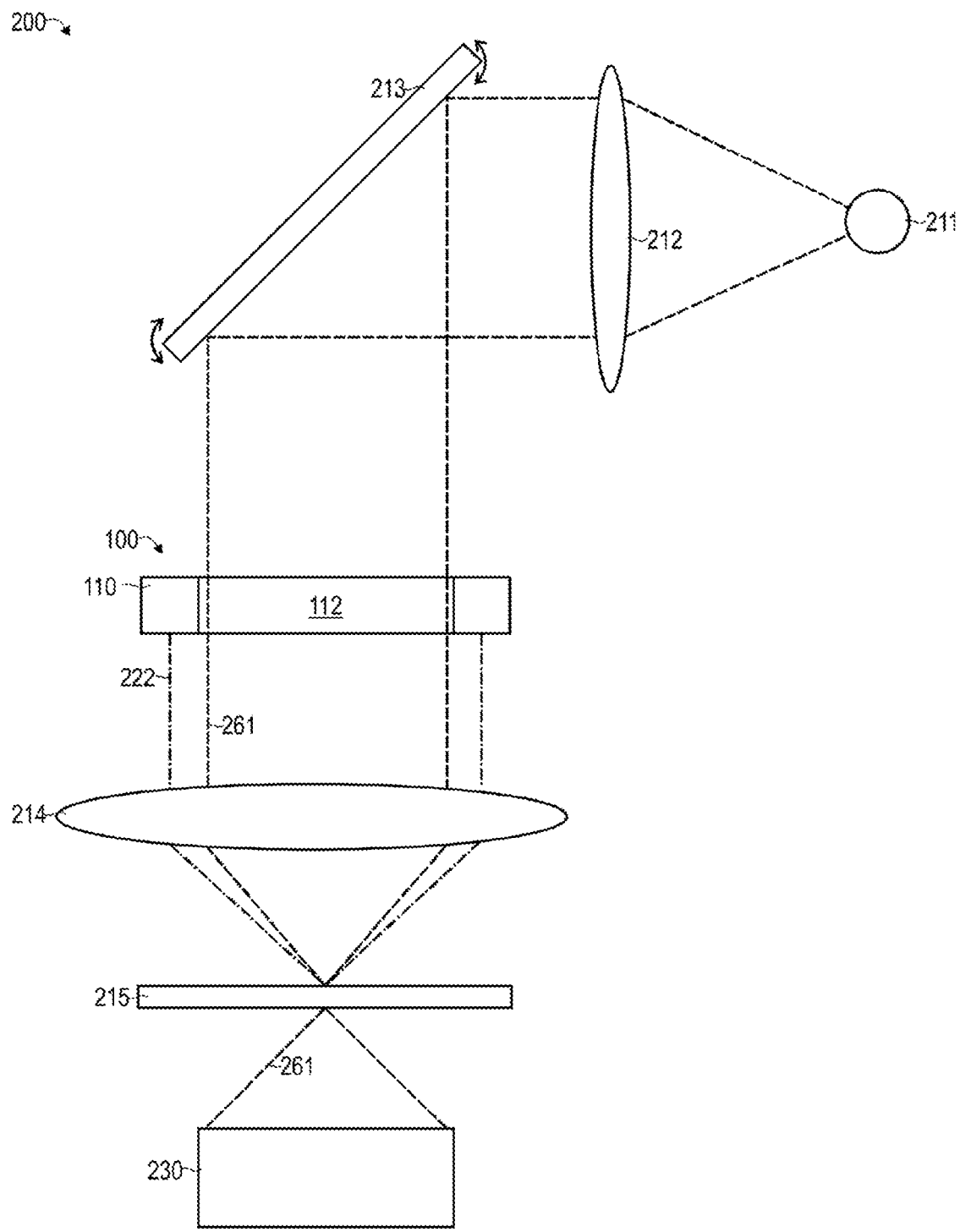
FIG. 4 schematically illustrates an LSM according to various embodiments, wherein, in the example of FIG. 4, the illumination module for angle-selective illumination and with the carrier is arranged in the region between a scanning optical unit of the LSM and an objective of the LSM in the beam path of a laser light source of the LSM.

FIG. 4 illustrates aspects in relation to an LSM 200. The LSM 200 comprises a first illumination module 211, which comprises a laser light source. The laser light source defines a first beam path 261 (illustrated by a dashed line in FIG. 4). A collimator optical unit 212 is provided. A scanning optical unit 213 is arranged in the beam path 261. An objective 214 is arranged close to a specimen holder 215. In relation to the first illumination module 211, the scanning optical unit 213 and the objective 214 are arranged upstream of the specimen holder 215 and directly in the beam path 261. The specimen holder 215 is configured to immobilize a specimen object in the beam path 261. The LSM 200 also comprises a detector 230, e.g., a PMT. The detector 230 is suitable for detecting a fluorescence signal of the specimen object.

In the example in FIG. 4, the detector 230 is arranged downstream of the specimen holder 215 in relation to the illumination module 211, i.e., in the passed beam path 221. In other examples, the detector 230 could also be arranged upstream of the specimen holder 215 in relation to the illumination module 211. To this end, output coupling in relation to the beam path 261 could be provided, for example in the form of a partly reflective mirror as a beam splitter (not illustrated in FIG. 4).

FIG. 4 also illustrate aspects in relation to the illumination module 100 for angle-selective illumination. By way of example, use could be made of the illumination module 100, which was discussed above in relation to FIGS. 1-3. FIG. 4 illustrates an exemplary arrangement of the illumination module 100 in the beam path 261. In the example in FIG. 4, the illumination module 100 is arranged between the scanning optical unit 213 and the objective 214, directly in the beam path 261. Here, it is clear that the light-transmissive region 112 has a lateral dimension that is greater than a beam width of the beam path 261 perpendicular to the beam path 261. Therefore, it is possible for the light to at least partly or largely pass through the illumination module 100 or the light-transmissive region along the beam path 261.

The illumination module 100 defines a further beam path 222 (dot-dashed line in FIG. 4). The beam path 222, too, can be used to illuminate the specimen object (not illustrated in FIG. 4) on the specimen holder 215. For the purposes of detecting a signal during the illumination of the specimen object by the illumination module 100, use can be made, for example, of the detector 230 or a further detector (not illustrated in FIG. 4).

Figure 5:
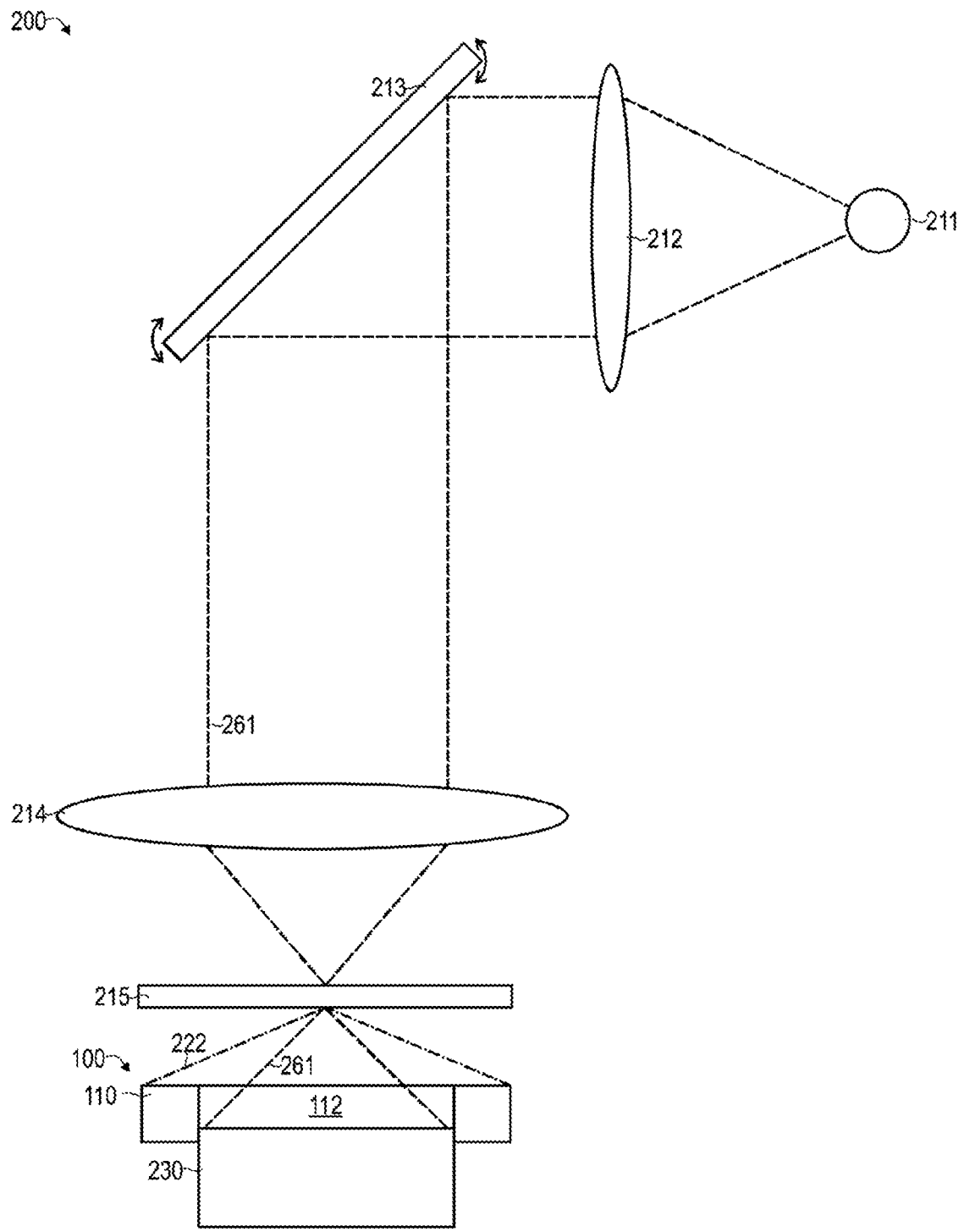
FIG. 5 schematically illustrates an LSM according to various embodiments, wherein, in the example of FIG. 5, the illumination module for angle-selective illumination and with the carrier is arranged downstream of a specimen holder of the LSM in relation to the laser light source of the LSM, in a passed beam path, wherein, in the example of FIG. 5, furthermore, the detector is partly formed in the aperture that is arranged centrally on the carrier.

FIG. 5 illustrates aspects in relation to an LSM 200. The LSM 200 according to the example of FIG. 5 substantially corresponds to the LSM 200 according to the example of FIG. 4. However, in the example in FIG. 5, the illumination module 100 is arranged at a different location in relation to the beam path 261. In the example in FIG. 5, the illumination module 100 is arranged in the passed beam path 261, i.e., on the opposite side of the specimen holder 215 in relation to the illumination module 211. In the example in FIG. 5, the detector 230 is partly arranged in the aperture implementing the light-transmissive region 112.

Despite the spatial proximity between the illumination module 100 and the detector 230, an interaction between these elements 100, 230 can be comparatively low. By way of example, this can be achieved by virtue of the detection spectrum of the detector 230 being different from the emission spectrum of the light sources 111.

While the detector 230 is arranged in the aperture of the light-transmissive region 112 in FIG. 5, the detector 230 and the illumination module 100 could be arranged separately from one another in the passed beam path in other examples, for example, according to an arrangement as discussed in FIG. 4.

The examples above illustrated scenarios in which the carrier 110 of the illumination module 100 has a light-transmissive region 112, which is implemented by an aperture, for example. However, in other examples, it is possible for the carrier 110 not to have a corresponding light-transmissive region 112. Such a scenario is illustrated in the example in FIG. 6A.

Figure 6A:
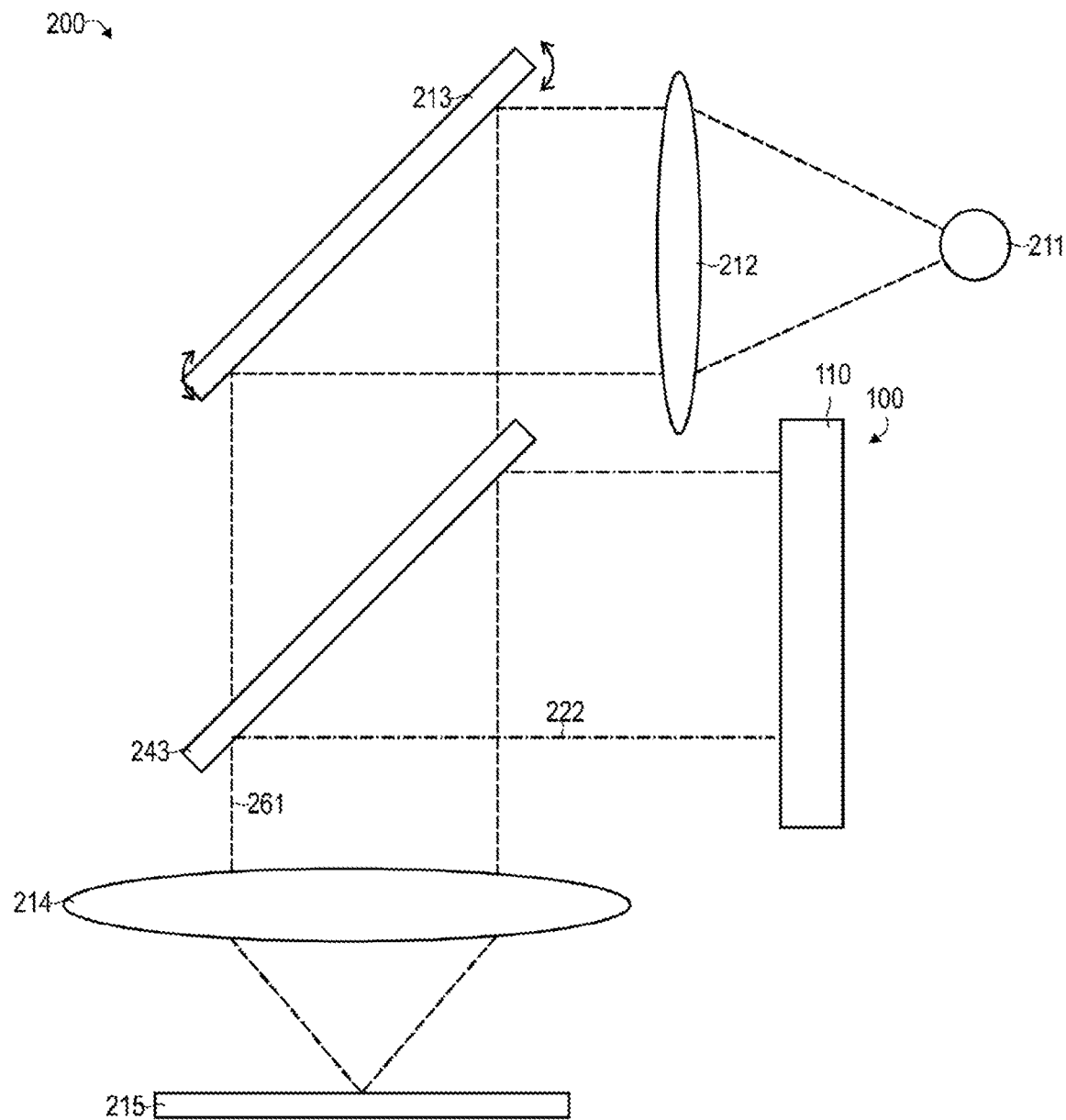
FIG. 6A schematically illustrates an LSM according to various embodiments, wherein, in the example of FIG. 6A, the illumination module for angle-selective illumination and with the carrier is arranged in the region between a scanning optical unit of the LSM and an objective of the LSM, mirrored into the beam path of the laser light source.

FIG. 6A illustrates aspects in relation to an LSM 200. In principle, the LSM 200 corresponds to the LSMs 200 discussed in relation to FIGS. 4 and 5 above. In the scenario in FIG. 6A, the illumination module 100 is arranged between the scanning optical unit 213 and the objective 214 in mirrored-in fashion. To this end, provision is made of a partly reflective mirror 243, which merges the beam path 222 associated with the illumination module 100 with the beam path 261. A light-transmissive region 112 is not provided.

Figure 6B:
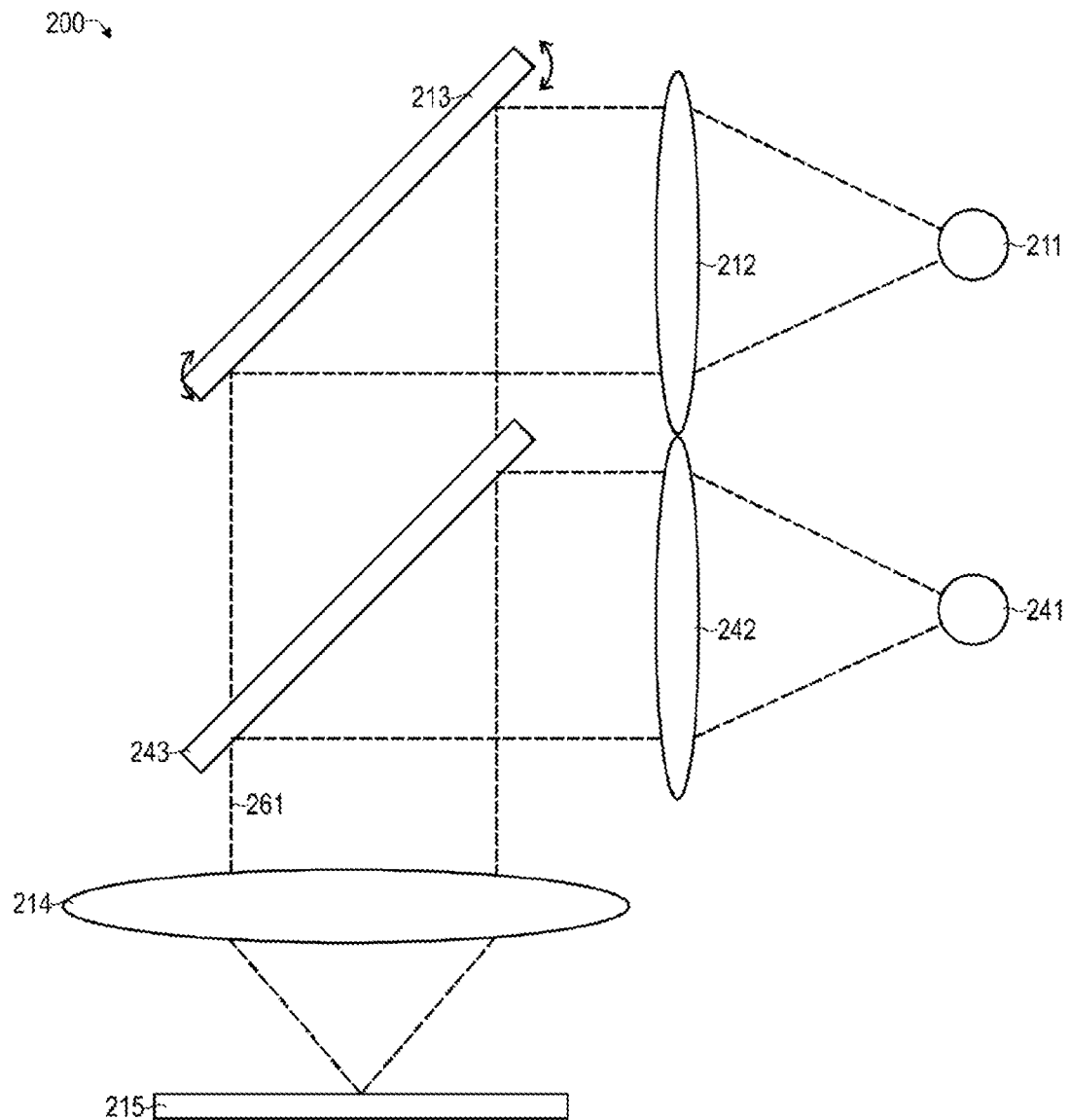
FIG. 6B schematically illustrates an LSM according to various embodiments, wherein, in the example of FIG. 6B, a further detector is arranged in mirrored-in fashion between the scanning optical unit and the objective of the LSM, wherein the further detector is configured for imaging a specimen object during illumination by the illumination module for angle-selective illumination.

FIG. 6B illustrates aspects in relation to an LSM 200. In particular, FIG. 6B illustrates aspects in relation to a further detector 241 (for reasons of clarity, the detector 230 is not illustrated in FIG. 6B; the latter could be arranged in the passed beam path or in the reflection beam path). The further detector 241 can be used to capture signals when the specimen object is illuminated by the further illumination module 100 (not illustrated in FIG. 6B for reasons of simplicity). In the example in FIG. 6B, the detector 241 is arranged between the scanning optical unit 213 and the objective 214 in mirrored-in fashion. To this end, provision is made of a further optical unit 242 and an output coupling unit 243. The arrangement of the detector 241 in FIG. 6B is purely exemplary; by way of example, in other implementations, the detector 241 could be arranged downstream of the scanning optical unit 213 in relation to the specimen holder 215 or else it could be arranged in the passed beam path 261, i.e., downstream of the specimen holder 215 in relation to the illumination module 211.

By way of example, the detector 241 may be a CCD sensor or a CMOS sensor. By way of example, the detector 241 could be part of a camera. By way of example, the detector 241 could produce an overview image. However, the detector 241 could also produce a greatly magnified image.

Figure 7:
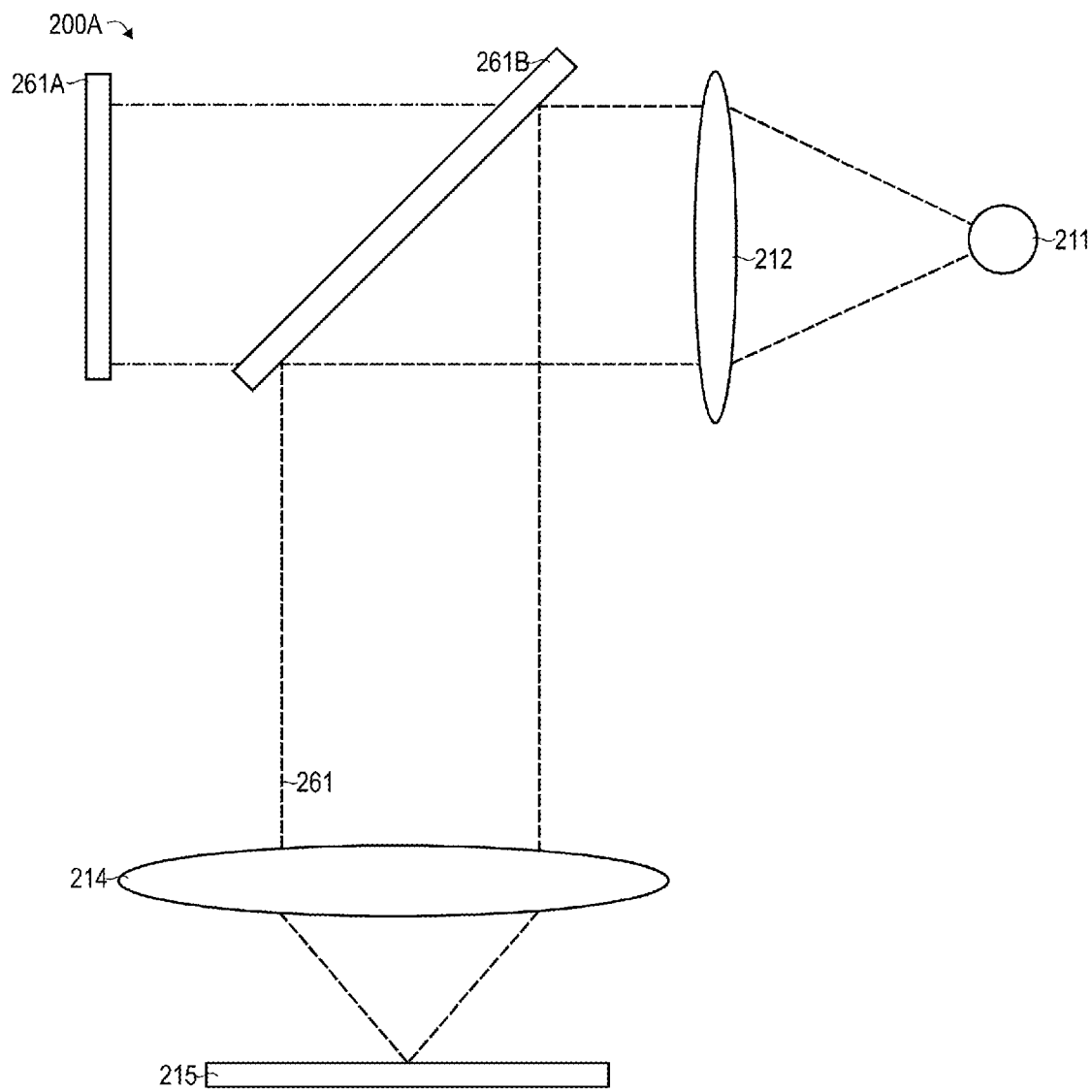
FIG. 7 schematically illustrates a conventional LSM, which comprises an illumination module with a halogen light source for phase-contrast imaging.

FIG. 7 illustrates aspects in relation to a conventional LSM 200A according to reference implementations, which also comprises a further illumination module 261A in addition to the illumination module 211 with the laser light source, it being possible to use said further illumination module in combination with a suitable objective (not illustrated in FIG. 7) for phase-contrast imaging purposes. In such a conventional LSM 200A, it may be necessary to replace the objective 214 with a further objective (not illustrated in FIG. 7), depending on the illumination mode (illumination by the illumination module 211 or the illumination module 261A). This increases the required installation space and requires a complicated mechanism. Moreover, it may not be possible, or only possible to a restricted extent, to simultaneously implement an illumination by the illumination module 211 and the illumination module 261A. By way of example, the mirror 261B may be tilted depending on the selected illumination.

Figure 8A:
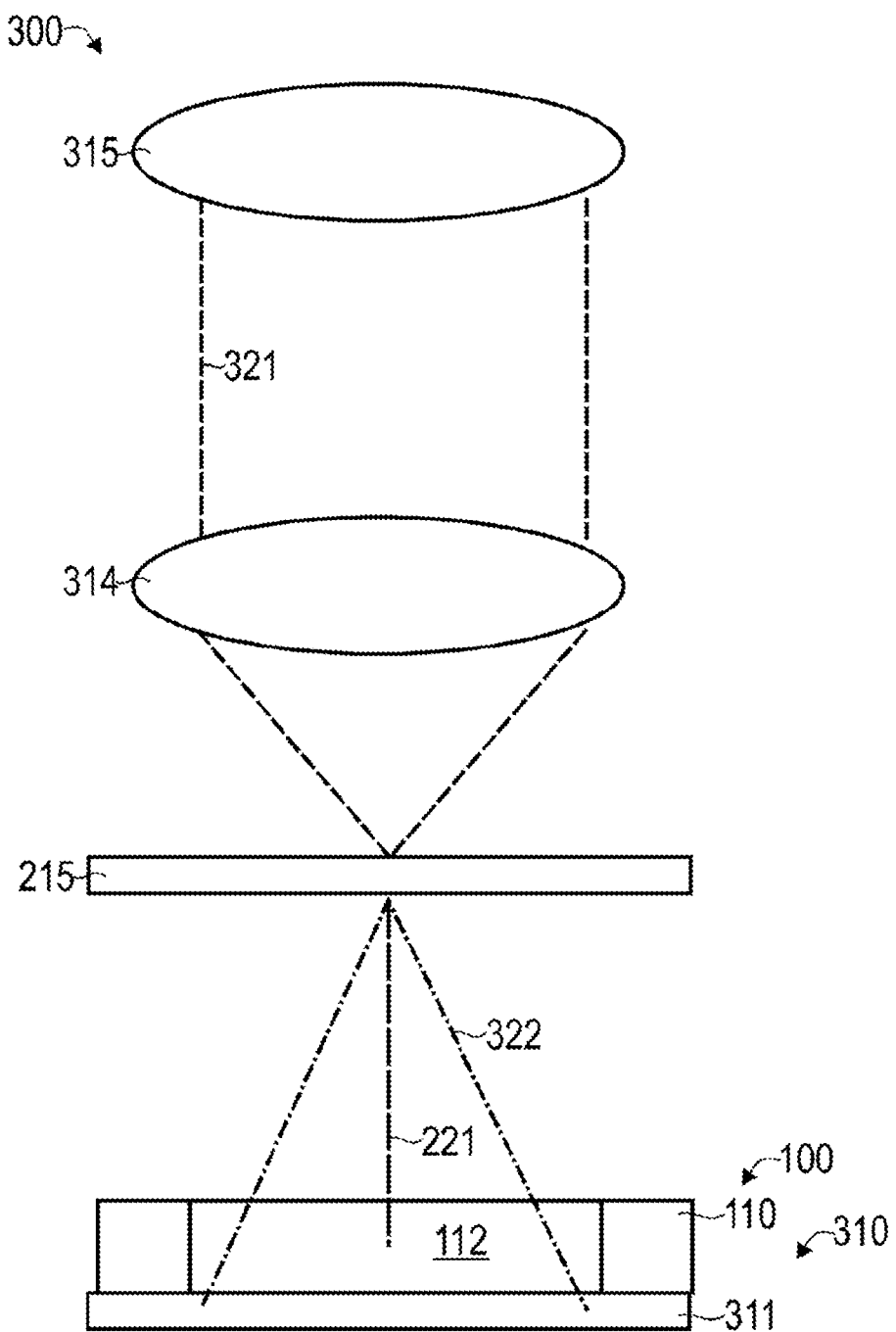
FIG. 8A schematically illustrates a microscope with a camera according to various embodiments, wherein the illumination module for angle-selective illumination is arranged in a passed beam path assigned to the camera.

FIG. 8A illustrates aspects in relation to an optical microscope 300, for example a reflected-light microscope or a transmitted-light microscope. The microscope 300 comprises an eyepiece 315 and an objective 314. The eyepiece 315 defines a detection beam path 321 (illustrated by the dashed line in FIG. 8A). While the example in FIG. 8A illustrates an eyepiece 315, the detection beam path 321 could also be combined with other units in other examples, for example with a CCD camera, etc. A corresponding statement applies to all examples described herein. The microscope 300 also comprises a specimen holder 215, which is configured to immobilize a specimen object in the beam path 321.

In the example in FIG. 8A, a camera 310, which is used to provide an overview image of the specimen holder 215 or the specimen object, is arranged in the passed beam path 322—which does not extend through the objective 314. The illumination module 100 is also arranged in the passed beam path 322. The central axis 221 is arranged concentrically with a central ray 221 of the passed beam path 322. The central ray corresponds to the optical axis of the microscope 300. The carrier 110 of the illumination module 100 is rigidly coupled to a camera body 311. Here, the illumination module 100 can be configured according to the other examples described herein. In particular, the illumination module 100 comprises a plurality of light sources 111 (not shown in FIG. 8A). The illumination module 110 is arranged in such a way that light along the beam path 322 can pass through the light-transmissive region 112, for instance an aperture that is arranged centrally or in off-centered fashion. The camera 310 is partly arranged in the aperture. As a result of providing the illumination module 110 in the beam path 322, it is possible to carry out a particularly space-saving implementation of the angle-selective illumination.

Figure 8B:
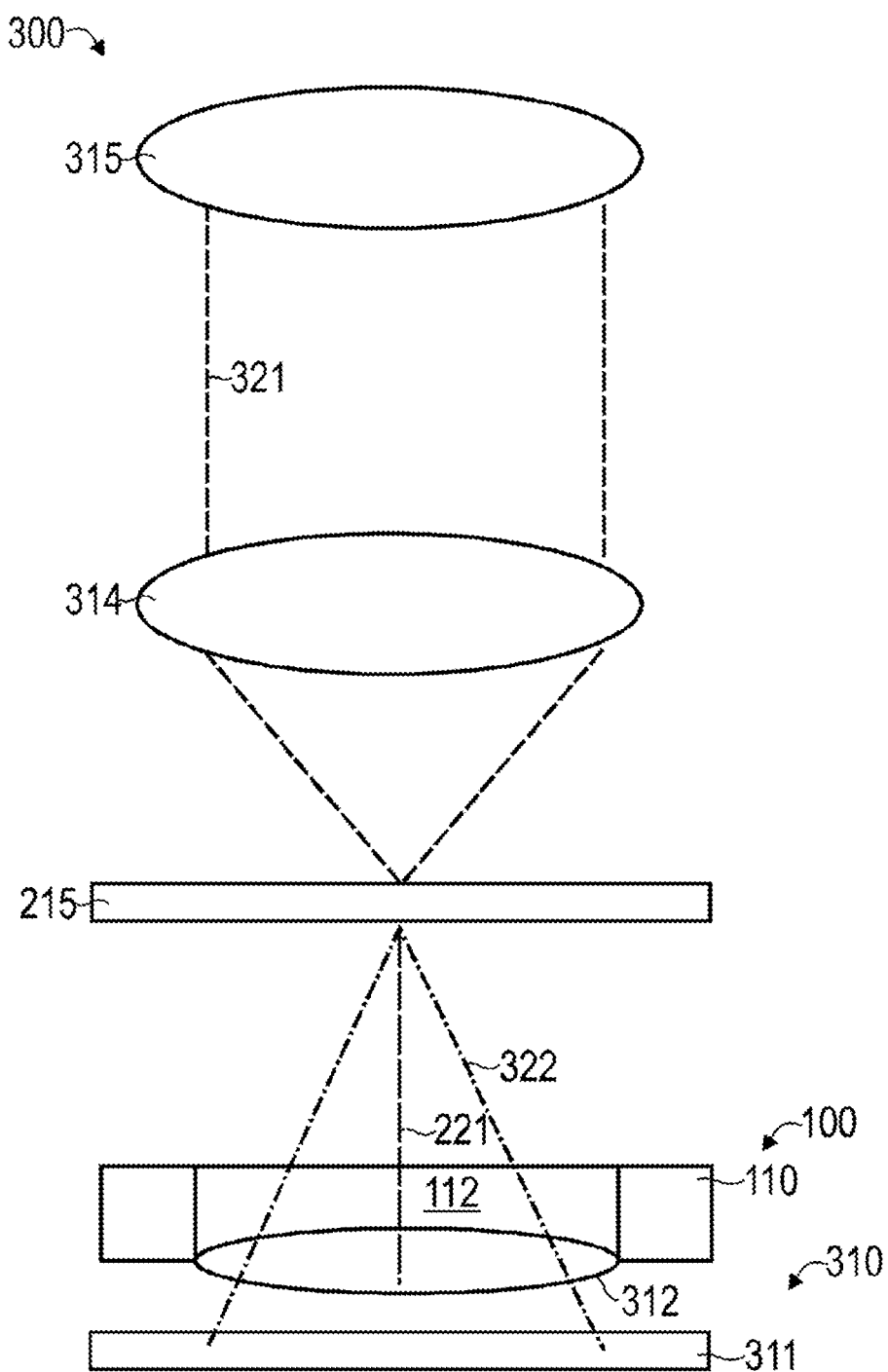
FIG. 8B schematically illustrates a microscope with a camera according to various embodiments, wherein the illumination module for angle-selective illumination is arranged in a passed beam path assigned to the camera.
Figure 8C:
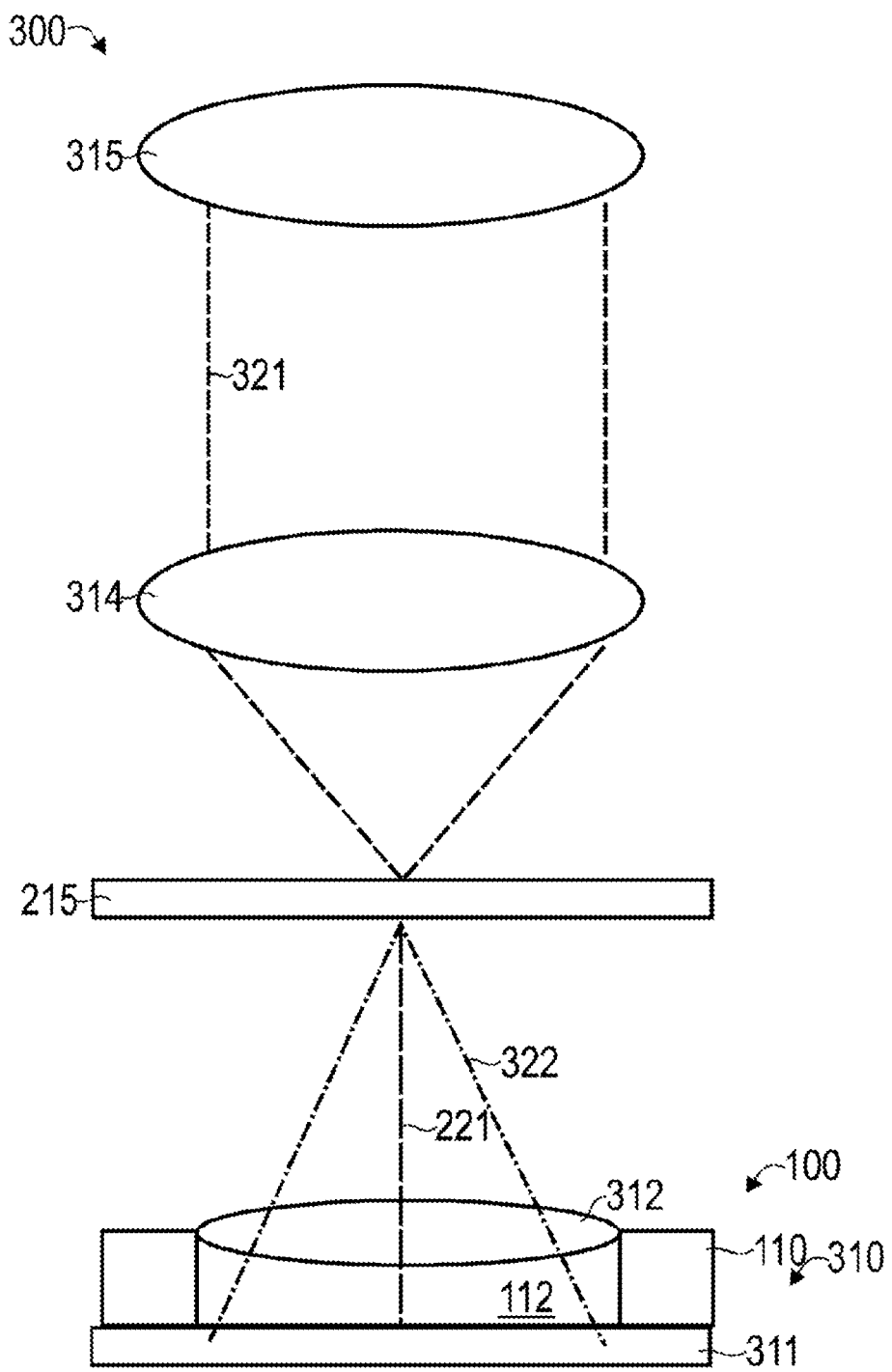
FIG. 8C schematically illustrates a microscope with a camera according to various embodiments, wherein the illumination module for angle-selective illumination is arranged in a passed beam path assigned to the camera.

FIGS. 8B and 8C illustrate aspects in relation to an optical microscope 300, for example a reflected-light microscope or a transmitted-light microscope. In principle, the optical microscope 300 according to FIGS. 8B, 8C corresponds to the optical microscope 300 according to FIG. 8A. In particular, the camera 310 and the illumination module 100 for angle-selective illumination are arranged, once again, in the passed beam path 322. However, in this case, the carrier 110 is not securely coupled to the camera body 311 in the example of FIG. 8B. In the example in FIG. 8B, an imaging optical unit 312 that is associated with the camera 310 is partly arranged in the light-transmissive region 112. In the example in FIG. 8C, the imaging optical unit 312 is, once again, partly arranged in the light-transmissive region 112, with, however, the carrier 110 being rigidly coupled to the camera body 311.

Figure 9A:
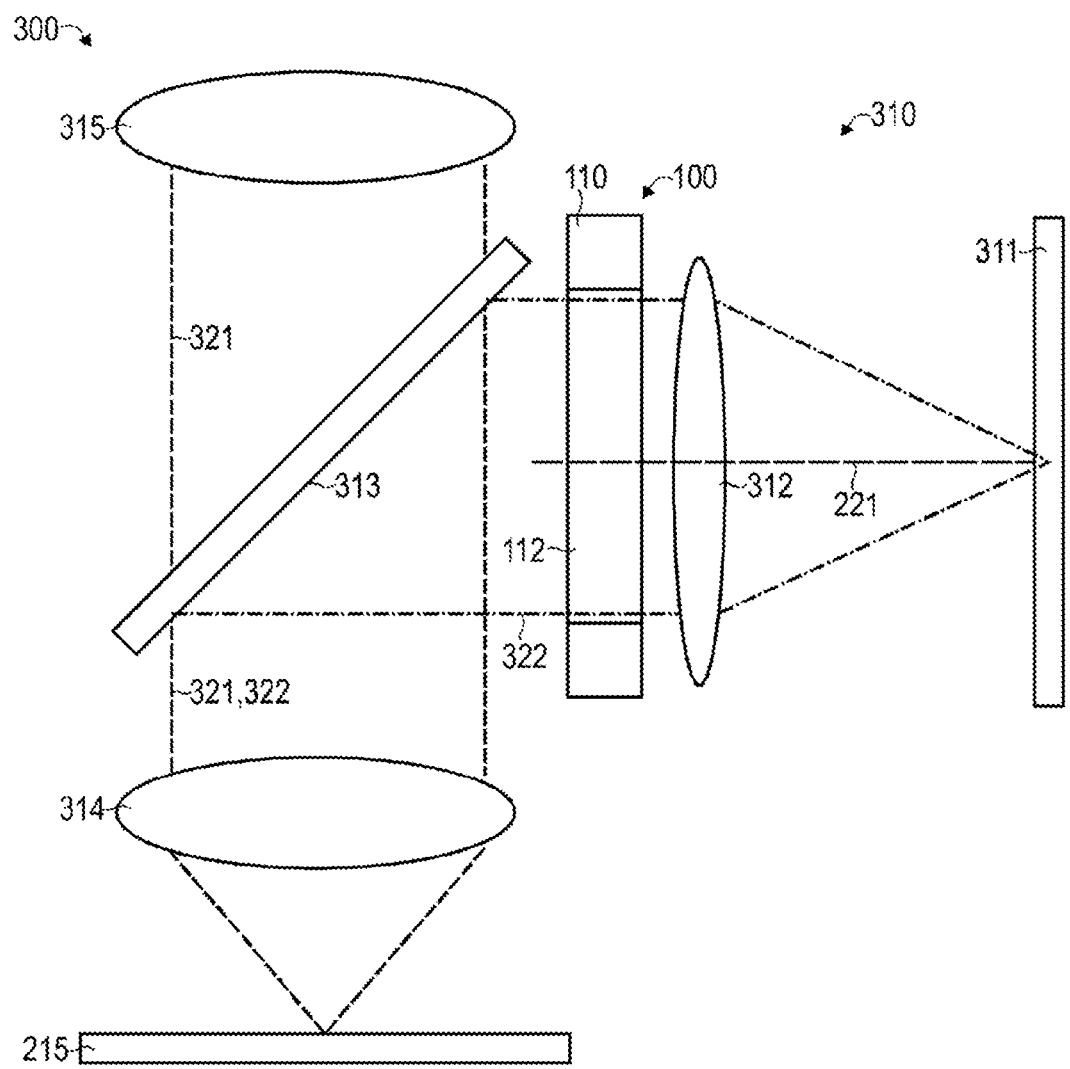
FIG. 9A schematically illustrates a microscope according to various embodiments, wherein the illumination module for angle-selective illumination is arranged in a beam path assigned to the camera.

FIG. 9A illustrates aspects in relation to an optical microscope 300, for example a reflected-light microscope or a transmitted-light microscope. In principle, the microscope in FIG. 9A corresponds to the microscope 300 in FIGS. 8A-8C. However, the beam path 322 associated with the camera 310 (illustrated by the dash-dotted line in FIG. 9A) in this case also extends through the objective 314. In particular, the beam path 322 is mirrored into the detection beam path 321. To this end, the microscope 300 comprises an output coupling unit 313, for example a beam splitter such as a partly reflective mirror. The imaging optical unit 312 is arranged in the region of the beam path 322. Moreover, the illumination module 110 is arranged in the region of the beam path 322. In particular, the illumination module 110 is arranged in such a way that light can pass through the light-transmissive region 112 along the beam path 322. The central axis 221 is arranged concentrically with a central ray of the beam path 322. As a result of providing the illumination module 110 in the beam path 322, it is possible to carry out a particularly space-saving implementation of the angle-selective illumination.

By way of example, it would be possible for the camera 311 to capture an image for the specimen object illuminated by the angle-selective illumination by means of the illumination module 110. It would also be possible to provide a further detector (not illustrated in FIG. 9A); the latter could be arranged in the passed beam path 322 or in the reflection beam path 322.

Figure 9B:
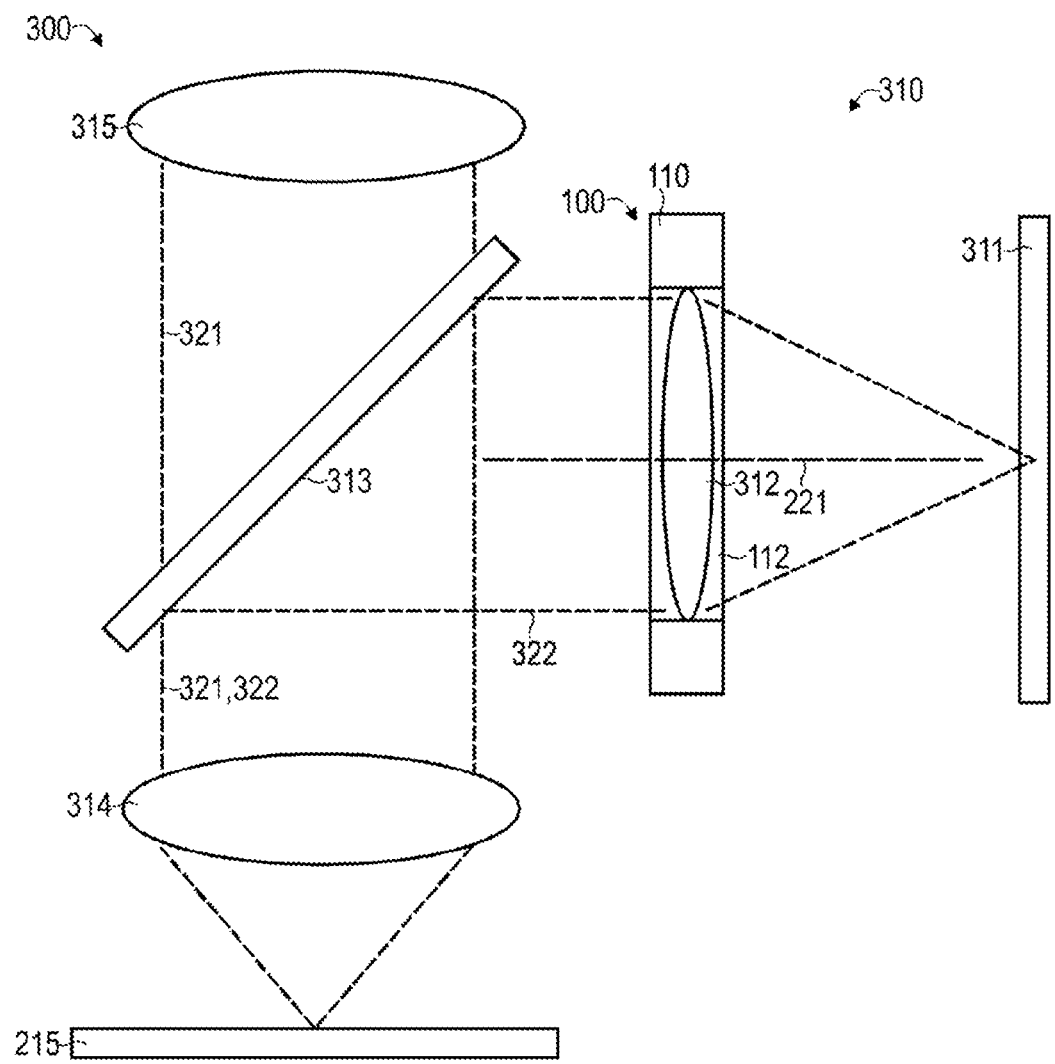
FIG. 9B schematically illustrates a microscope according to various embodiments, wherein the illumination module for angle-selective illumination is arranged in a beam path assigned to the camera and an imaging optical unit is arranged in the region of an aperture that is arranged centrally on the carrier.

FIG. 9B illustrates aspects in relation to a microscope 300. In principle, the microscope 300 of the example in FIG. 9B corresponds to the microscope 300 of the example in FIG. 9A. In the example in FIG. 9B, the imaging optical unit 312 is partly arranged in the light-transmissive region 112 of the illumination module 100. Here, the light-transmissive region 112 can be embodied as an aperture, as already described above. By way of example, it would be possible for a lens element, a grating and/or a filter of the imaging optical unit 312 to be arranged in the aperture. In this way, a particularly space-saving integration of the illumination module 100 can be ensured.

Figure 9C:
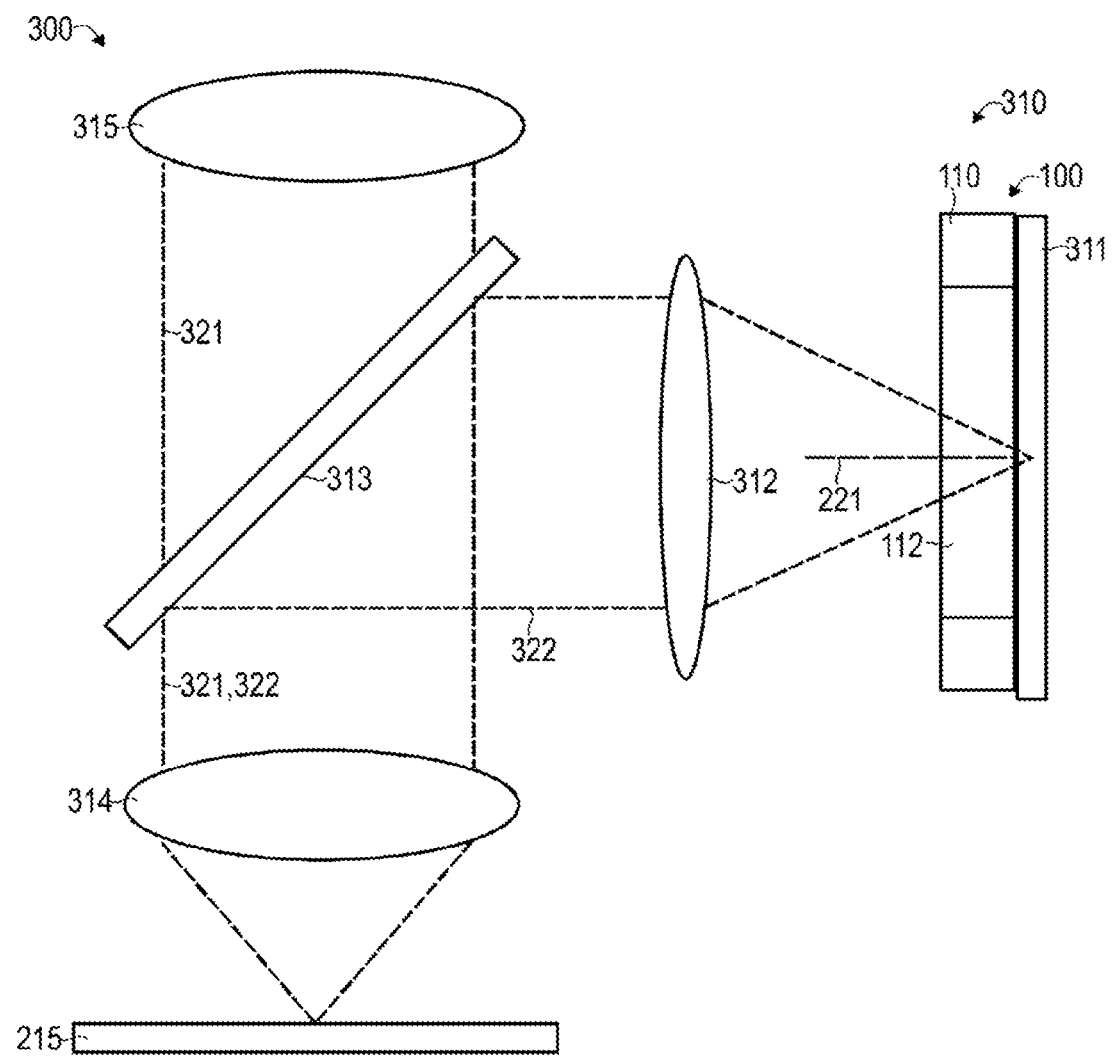
FIG. 9C schematically illustrates a microscope according to various embodiments, wherein the illumination module for angle-selective illumination is arranged in a beam path assigned to the camera and the camera is coupled to the illumination module.

FIG. 9C illustrates aspects in relation to a microscope 300. In principle, the microscope 300 of the example in FIG. 9C corresponds to the microscope 300 of the examples in FIGS. 8A-8C and 9A-9B. In the example in FIG. 9C, the illumination module 100 is combined with the camera 311. In this way, a particularly space-saving integration of the illumination module 100 can be ensured. By way of example, a sensor area of the camera 311 could be arranged adjacent to, or within, the light-transmissive region 112. By way of example, the camera 311 can be embodied with a secure connection to the illumination module 110.

The microscope 300 of FIGS. 8A, 8B, 8C, 9A, 9B, 9C, 10 could have a further illumination module. The latter could serve to illuminate the specimen object in the case of an observation through the eyepiece. By way of example, the further illumination source could comprise a collimator optical unit and a light source. However, it would also be possible for the illumination module 100 for illuminating the specimen object to be used during the observation through the eyepiece. To this end, for example, a plurality of light sources 111 could be operated at the same time in order to facilitate a uniform illumination of the specimen object.

Figure 10A:
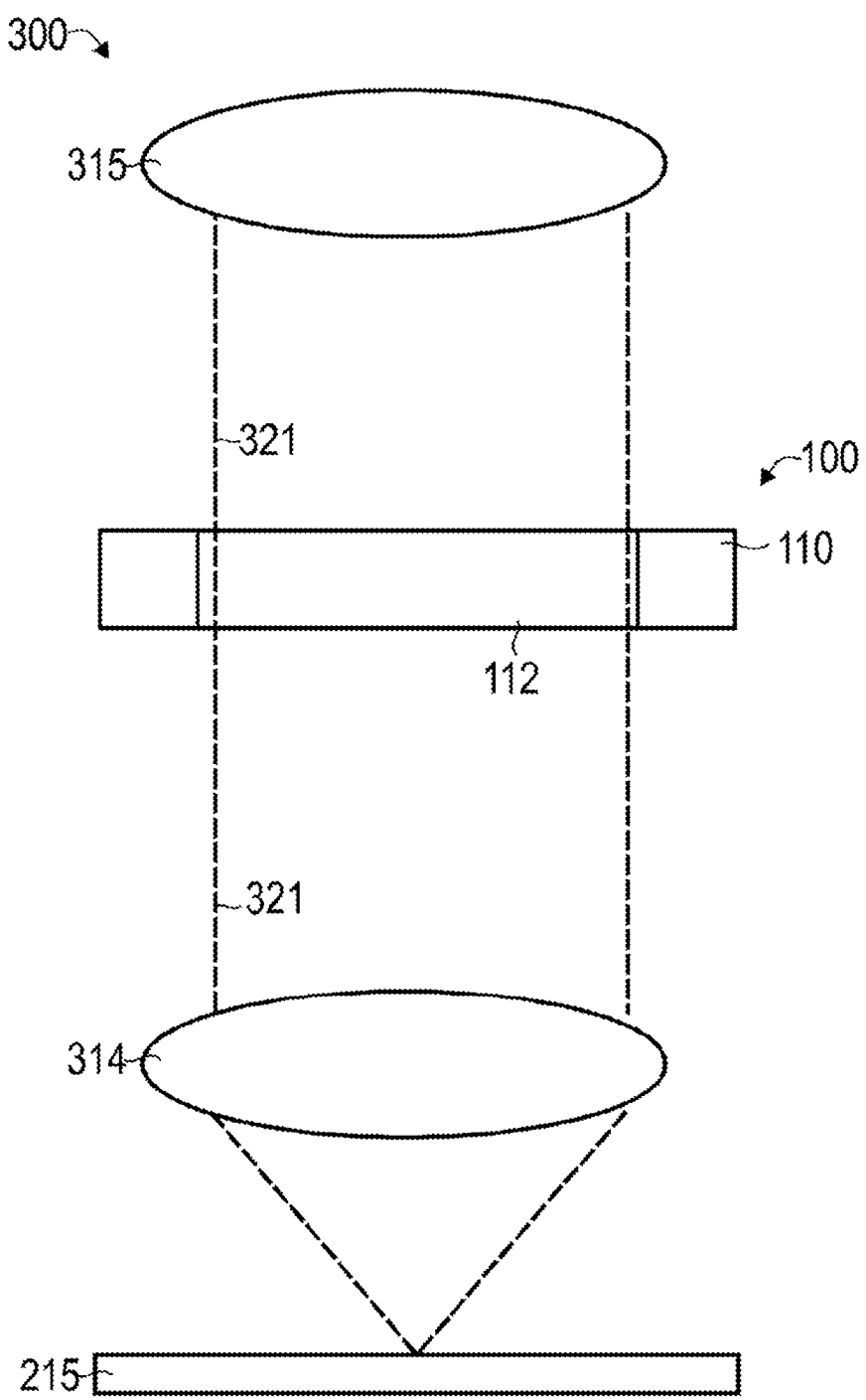
FIG. 10A schematically illustrates a microscope according to various embodiments, wherein the illumination module for angle-selective illumination is arranged in a detection beam path.

FIG. 10A illustrates aspects in relation to a microscope 300. In principle, the microscope 300 of the example in FIG. 10A corresponds to the microscope 300 of the examples in FIGS. 8A-8C and 9A-9C. In the example of FIG. 10A, the illumination module 100 is arranged directly in the detection beam path 321 and it has an extent transversely to the detection beam path 321. This can ensure a particularly space-saving integration of the illumination module 100. There is no need to provide a separate further beam path 322.

Figure 10B:
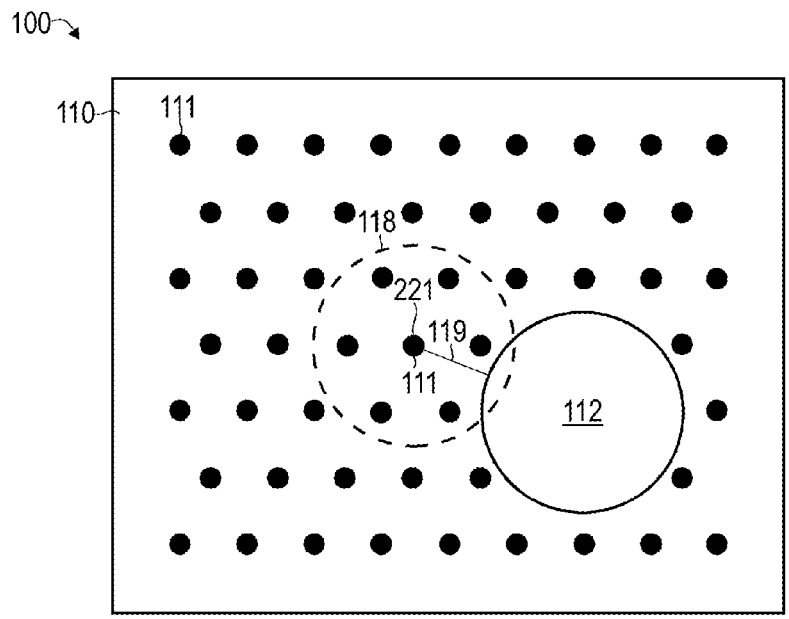
FIG. 10B schematically illustrates the illumination module for angle-selective illumination and with the carrier and the plurality of light sources according to various embodiments, wherein the light-transmissive region is embodied as an aperture that is arranged on the carrier in off-centered fashion.

FIG. 10B illustrates aspects in relation to the illumination module 100. The illumination module 100 comprises a light-transmissive region 112, which is embodied as an aperture that is arranged in an off-centered fashion. Here, the aperture 112 has a distance 119 from the central axis 221, which may be coincident with a central ray of the respective beam path in the case of an arrangement of the illumination module 100 in an optical apparatus 200, 300.

An illumination module 100 according to the example in FIG. 10B may be desirable, in particular in relation to an arrangement of the illumination module 100 in the passed beam path 322 of an optical microscope 300, i.e., in relation to the detection beam path 321 downstream of the detector; see FIGS. 8A-8C. Then, direct light that is produced by centrally arranged light sources 111—i.e., between the central axis 221 and the aperture 112—can be incident in the objective 314.

In the example in FIG. 10B, the distance 119 is selected to be so small that a projection 118 of the smallest aperture of the objective 314 on the carrier 110 (illustrated by the dashed line in FIG. 10B) comprises light sources 111 and the aperture 112 is arranged adjacently. As a result, bright-field imaging can be achieved.

While the example in FIG. 10B was discussed in relation to the light-transmissive region 112 implemented by an aperture, corresponding techniques can also be used in other examples for differently implemented light-transmissive regions.

Figure 10C:
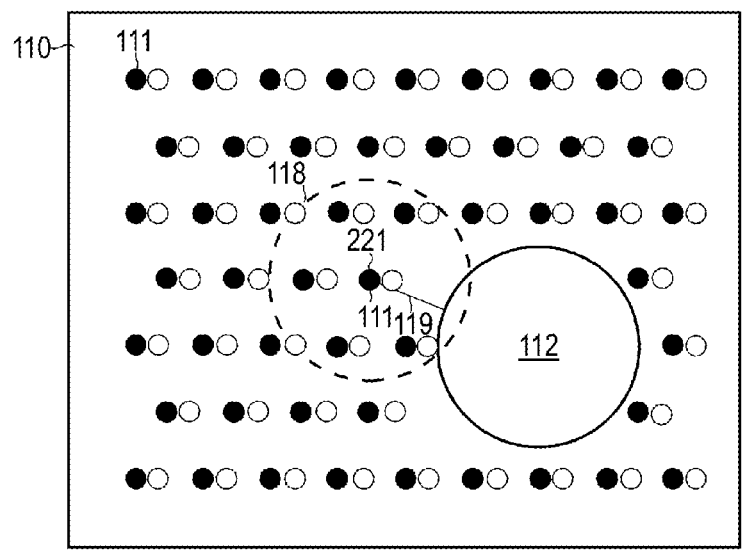
FIG. 10C schematically illustrates the illumination module for angle-selective illumination and with the carrier and the plurality of light sources according to various embodiments, wherein the light-transmissive region is embodied as an aperture that is arranged on the carrier in off-centered fashion.

FIG. 10C illustrates aspects in relation to the illumination module 100. In principle, the illumination module 100 in FIG. 10C corresponds to the illumination module 100 in FIG. 10B. Here, each light source 111 comprises two channels for light with different wavelength and/or polarization. It would also be possible for each light source 111 to have more than two channels.

By means of such techniques, it is possible to implement different illumination directions with light of different wavelengths and/or polarizations.

Figure 11:
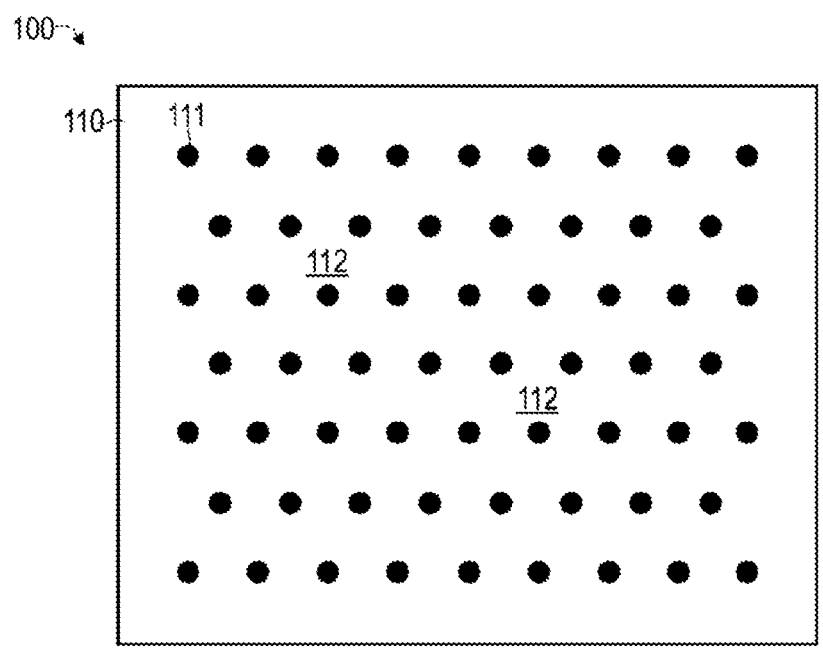
FIG. 11 schematically illustrates the illumination module for angle-selective illumination according to various embodiments, wherein the carrier of the illumination module is formed from light-transmissive material and the light sources of the illumination module are arranged on the surface of the carrier with a low geometric fill factor.

FIG. 11 illustrates aspects in relation to the illumination module 100. FIG. 11 illustrates an example, in which the carrier 111 is formed from light-transmissive solid material. Then, interstices between the various light sources 111 implement the light-transmissive region 112.

In the example in FIG. 11, the light sources 111 are arranged in a matrix structure with a hexagonal unit cell. Other arrangements of the light sources 111 would also be possible, for example a matrix structure with a rectangular unit cell, etc., or an unordered arrangement. By way of example, it would be possible for respectively adjacent light sources 111 of the matrix structure to have different colors and/or polarizations of the respectively emitted light.

In the example in FIG. 11, the light sources 111 are arranged on the upper side 110A of the carrier 110 (in the plane of the drawing in FIG. 11) with a comparatively low geometric fill factor of less than 30% (in FIG. 11, the geometric fill factor corresponds to the sum of the areas of all black regions relative to the overall area of the carrier 110). As a result of the comparatively low geometric fill factor, it is possible for a significant quantity of incident light to be able to pass through the carrier 110 of the illumination module 100 in the region of the interstices between the various light sources 111.

Figure 12:
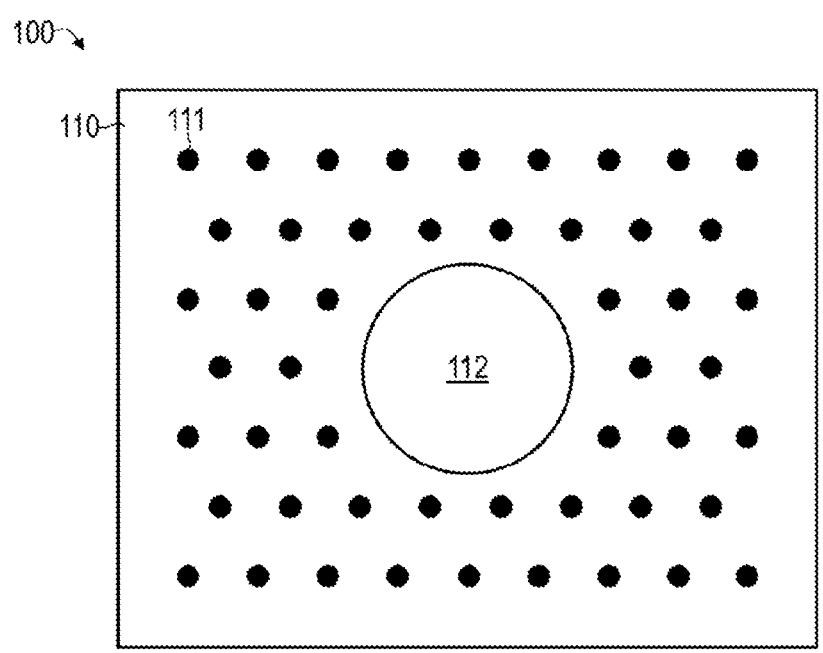
FIG. 12 schematically illustrates the illumination module for angle-selective illumination according to various embodiments, wherein the light-transmissive region of the illumination module is embodied as an aperture that is arranged centrally on the carrier.

FIG. 12 illustrates aspects in relation to the illumination module 100. FIG. 12 illustrates an example, in which the carrier 110 is produced from non-light-transmissive material, for example aluminum or a plastics material. In the example in FIG. 12, the light-transmissive region 112 is formed by a centrally arranged aperture. By way of example, in the case of an arrangement of the illumination module 100 in a microscope or LSM, it may be possible for the space within the light-transmissive region 112/the aperture to remain free, or else for other optically effective elements, such as, e.g., a detector, a lens element, etc., to be arranged within the aperture.

While FIG. 12 shows an example in which the light-transmissive region 112 is arranged in a center of the carrier 110, the light-transmissive region 112 may also be arranged away from the center of the carrier 110 in other examples. In principle, it is not necessary either for the light-transmissive region 112 to have a symmetric form in relation to a central axis.

Figure 13:
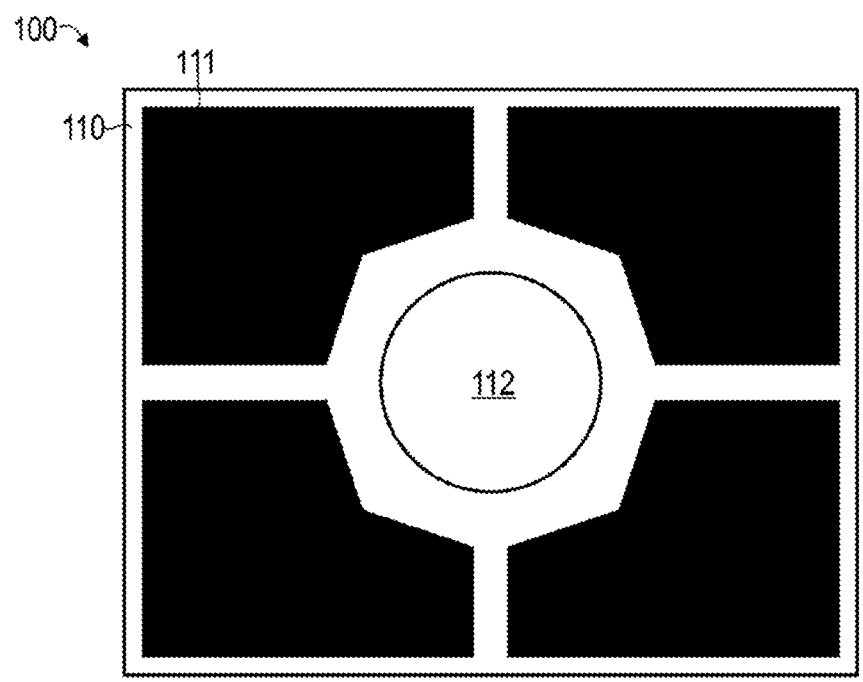
FIG. 13 schematically illustrates the illumination module for angle-selective illumination according to various embodiments, wherein the plurality of light sources of the illumination module are implemented by organic light-emitting diodes.

FIG. 13 illustrates aspects in relation to the illumination module 100. In FIG. 13, the various quadrants of the carrier 110 are occupied by laterally extended light sources 111. By way of example, the light sources 111 in the example of FIG. 13 can be implemented by way of organic light-emitting diodes. By means of such a configuration of the illumination module 100, illuminating the specimen object from extended solid angles may be possible.

Figure 14:
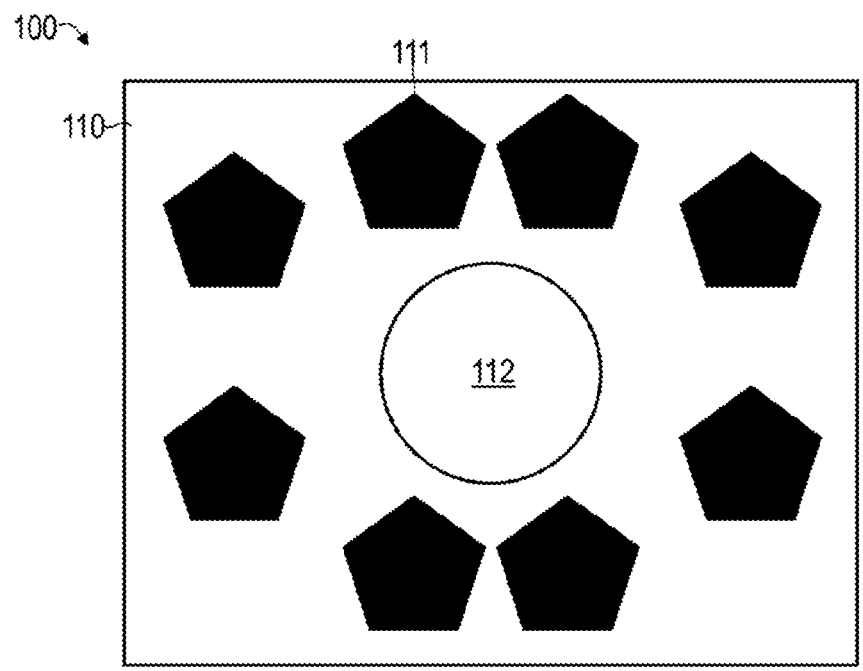
FIG. 14 schematically illustrates the illumination module for angle-selective illumination according to various embodiments, wherein the plurality of light sources are implemented by halogen light sources.

FIG. 14 illustrates aspects in relation to the illumination module 100. In FIG. 14, the various light sources 111 are embodied as halogen light sources. These are arranged symmetrically in relation to a central axis.

Figure 15:
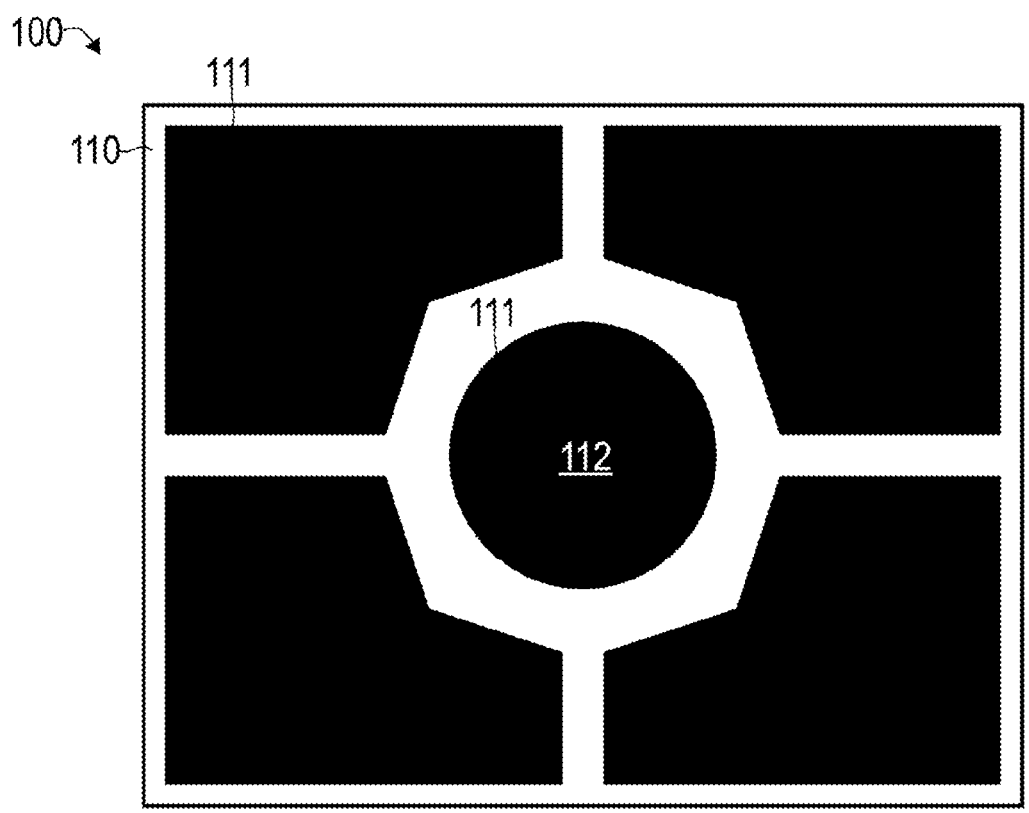
FIG. 15 schematically illustrates the illumination module for angle-selective illumination according to various embodiments, wherein the light-transmissive region and the plurality of light sources are implemented by organic light-emitting diodes.

FIG. 15 illustrates aspects in relation to the illumination module 100. In FIG. 15, the light-transmissive region 112 is implemented by light-transmissive organic light-emitting diodes 111. Here, the carrier 110 can be formed from non-light-transmissive material, for example.

From a comparison of FIGS. 10-15, it is clear that the configuration of the illumination module 100 can vary greatly in various examples. In particular, configurations, as illustrated in relation to FIGS. 10-15, may be combined with one another.

Figure 16:
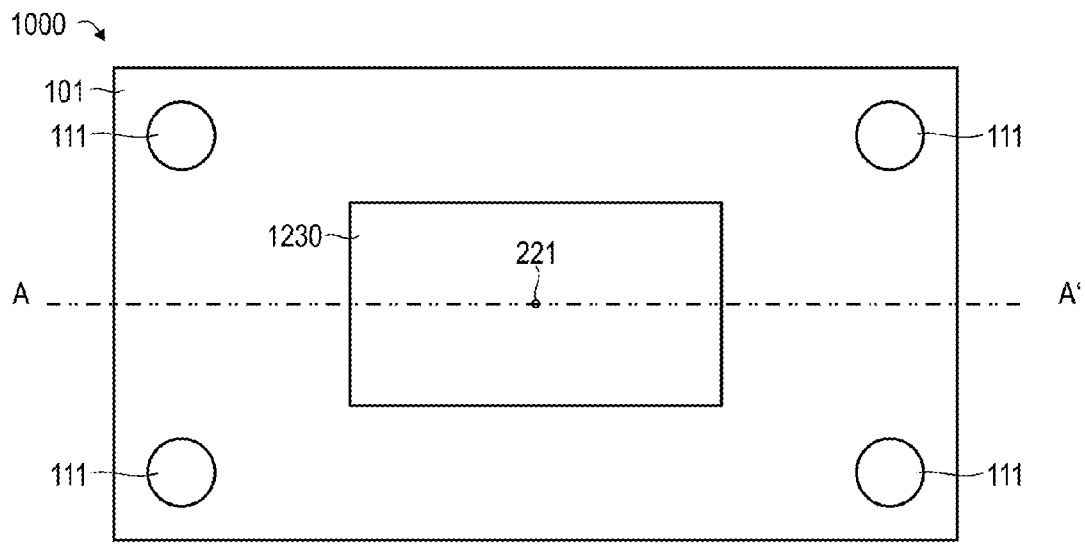
FIG. 16 is a schematic plan view of an illumination module for angle-selective illumination and with a carrier, on which a detector is attached according to various embodiments.

FIG. 16 illustrates aspects in relation to an illumination module 1000. The illumination module 1000 according to the example of FIG. 16 corresponds, in principle, to the illumination module 100 according to the example of FIG. 1. Here, the carrier 101 of the illumination module 1000—in contrast to the example in FIG. 1—has no light-transmissive region. A detector 1230 is attached to the carrier 101 in the example of FIG. 16. By way of example, the detector 1230 can be attached to the upper side 110A of the carrier 101; see FIG. 17. Then, the sensor area 1231 is at a distance from the surface 110A. By way of example, the detector 1230 can be adhesively bonded, screwed or fastened differently to the carrier 101.

Figure 17:
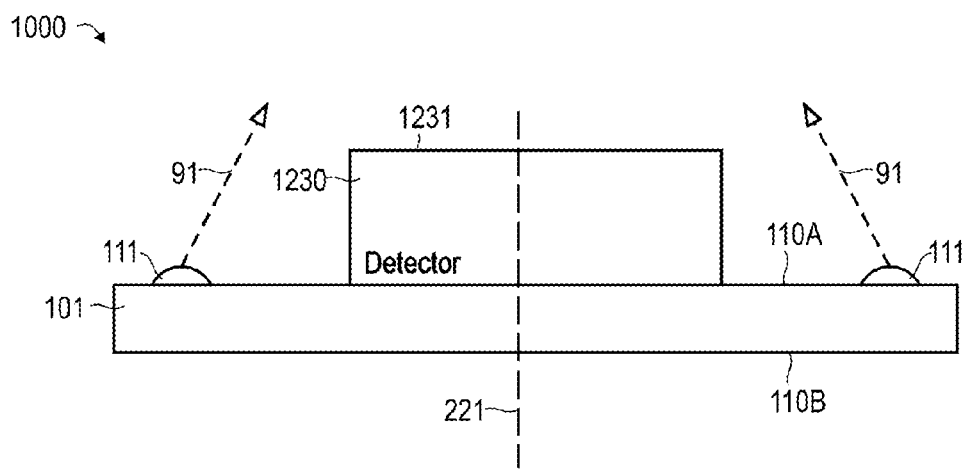
FIG. 17 is a schematic side view of the illumination module for angle-selective illumination according to FIG. 16.

In the examples in FIGS. 16 and 17, the detector 1230 is arranged centrally on the carrier 101. In particular, this means that the detector 1230 is arranged centrally in relation to the axis 221. In various examples, it would also be possible, however, for the detector 1230 to be arranged on the carrier 101 in off-centered fashion. By way of example, it would be possible for different techniques, which were described above in relation to FIG. 10B, to be applied in relation to the detector 1230. Thus, it would be possible for the detector 1230 to have a distance from the center of the carrier 110, with at least one of the light sources 111 of the illumination module 100 being arranged between the center of the carrier 110 and the detector 1230. Once again, the distance between the detector 1230 and the center of the carrier 110 can correspond to a projection 118 of the aperture of the objective 314 on the carrier 110. This can promote bright-field illumination.

In the examples in FIGS. 16 and 17, the module 1000 in each case has a single detector 1230. However, it would be possible in the various examples for the module 1000 to have more than a single detector, for example two or three detectors. Here, the plurality of detectors can be attached at a distance from one another on the carrier 101. By way of example, the plurality of detectors 1230 could be attached to different sides of the axis 221 or in different quadrants in relation to the axis 221.

Figure 18:
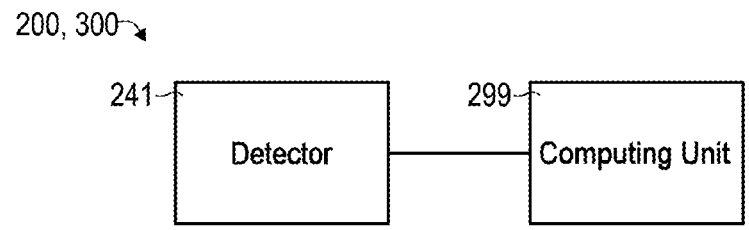
FIG. 18 schematically illustrates an optical apparatus according to various embodiments with a detector and a computing unit.

FIG. 18 is a schematic illustration of the optical apparatus 200, 300, which is configured for angle-selective illumination according to various examples described herein. The optical apparatus 200, 300 comprises the detector 241, which detects light that is emitted from the light sources 111 of the illumination module 110. The optical apparatus 200, 300 also comprises a computing unit 299. The computing unit 299 is configured to actuate the illumination module 100 or the light sources 111 for separate and/or sequential illumination of the specimen object from a plurality of illumination directions. To this end, different light sources 111 can be activated separately and/or in sequence, for example. By way of example, an illumination direction can denote the illumination from an angle or solid angle. Furthermore, for each illumination direction, the computing unit 299 is configured to actuate the detector 241 for capturing a respective measurement image of the object.

Furthermore, the computing unit 299 is configured to combine the measurement images to obtain a result image. The result image has a phase contrast. Here, the computing unit 299 can be configured to apply techniques of digital post-processing, which are disclosed in relation to DE 10 2014 112 242 A1.

Figure 19:
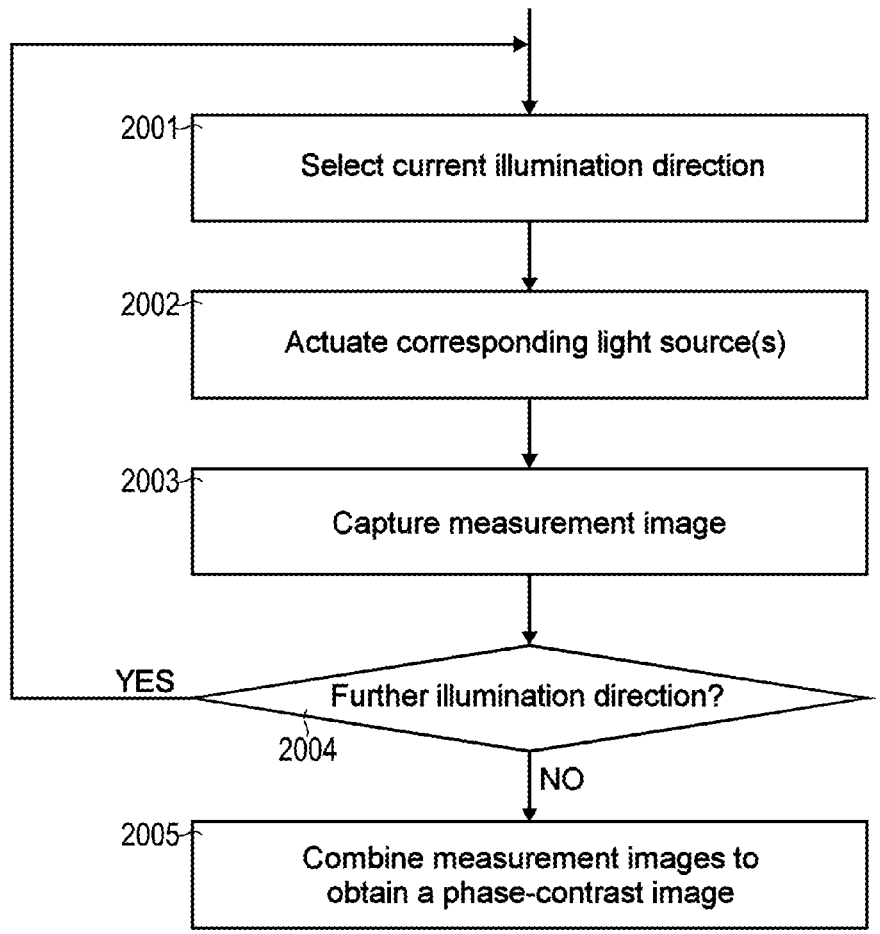
FIG. 19 is a flowchart of a method according to various embodiments.

FIG. 19 is a flowchart of a method according to various examples. By way of example, the computing unit 299 could be configured to carry out the method according to FIG. 19.

Initially, a current illumination direction 91 is selected in step 2001. Then, one or more light sources 111 are activated in step 2002 such that the illumination of a specimen object is obtained from the selected illumination directions. An associated measurement image is captured in step 2003, for example by means of a suitable detector 241, for example by means of a CCD detector or a CMOS detector, an overview camera and/or a photomultiplier. To this end, the detector 241 can be actuated in a suitable manner. The measurement image is captured while the specimen object is illuminated from the current illumination directions.

Then, a check is carried out in step 2004 as to whether it is necessary to capture a further measurement image from a further illumination direction 91. If this is the case, steps 2001-2003 are carried out again.

Subsequently, a result image is produced in step 2002. The result image has a phase contrast for an imaged object (phase-contrast image). The phase-contrast image is determined by combining the measurement images, which were captured in the iterations of step 2003.

While the measurement images typically have no, or no significant, phase-contrast, it is possible to produce the phase-contrast image by combining the measurement images, said phase-contrast image having a significant phase-contrast component. Particularly in comparison with other conventional techniques of phase-contrast imaging, the method described in the present case can obtain the effect of a particularly simple implementation of the phase-contrast imaging on the one hand and the effect of a particularly simple, and hence cost effective and robust, configuration of the optical apparatus on the other hand.

By way of example, it would be possible for the illumination directions to form pairs in each case or to be arranged in pair-wise fashion. Here, it may be possible for an illumination direction always to be assigned to only one pair. However, it would also be possible for at least some of the illumination directions to be assigned to a plurality of pairs.

At least the measurement images of the illumination directions belonging to one pair can then be combined to obtain a respective result image.

Different criteria for the assignment of two illumination directions 91 to a pair may apply. By way of example, geometric criteria of the illumination directions 91 of a pair may apply, for instance in relation to the optical axis; in this way, it may be possible to produce a particularly high phase-contrast component in the phase-contrast image, for example. By way of example, the illumination directions of a pair could be included symmetrically in relation to the axis of the optical apparatus along which an idealized light ray experiences no, or only little, deflection (optical axis) and/or be arranged symmetrically in relation to a plane containing the optical axis. However, as an alternative or in addition thereto, it would also be possible to take account of a time of illumination and capture as an alternative or additional criterion of the belonging of two illumination directions 91 to a pair; by way of example, those illumination directions 91, for which the respective measurement image is captured immediately in succession or successively in a timely fashion, can form a pair; in this way, a certain robustness in relation to movement artifacts could be obtained, for example. In general, a subsequent evaluation for producing the phase-contrast image can also be taken into account as an alternative or additional criterion for the belonging of two illumination directions 91 to a pair; by way of example, an individual result image could always be produced for the two measurement images of a pair by combining these measurement images.

It would be possible for the two illumination directions 91 of a pair to include correlating angles with the optical axis. By way of example, correlating angles can mean: substantially the same angles or substantially the same angles in terms of magnitude; substantially can be characterized, in particular, in relation to technical limitations in the accuracy, such as, e.g., systematic or statistical errors when capturing the measurement images by the optical apparatus and/or a limitation of an illumination apparatus of the optical apparatus caused by the construction thereof. To the extent that angles which, although they are different in absolute terms, are the same within the accuracy of the optical apparatus, for example, are implemented, this can satisfy such a criterion of substantially the same angles. Such criteria apply below to corresponding specifications of angles and/or other properties of illumination directions 91 or of the optical apparatus.

For the purposes of describing geometric properties of the illumination directions, it may be helpful to describe the illumination directions 91 by way of an illumination vector. The illumination vectors can be defined in relation to an origin of the optical apparatus, for instance in relation to the object and/or an intersection of a focal plane with the optical axis. A length of the illumination vectors can correspond to an amplitude of the illumination from the respective illumination direction, for example; in the subsequent explanation of the orientation of various illumination vectors, it may be possible to dispense with taking account of a length of the illumination vectors. Then, the angle included by an illumination vector with the optical axis may correspond to the angle of the respective illumination direction.

By way of example, it may be desirable for illumination vectors of a pair of illumination directions to include an angle with one another, said angle being greater than 10°, preferably greater than 20°, particularly preferably greater than 40°. As an alternative or in addition thereto, it would also be possible for illumination vectors of a pair of illumination directions to each include an angle with the optical axis, said angle being greater than 5°, preferably greater than 10°, particularly preferably greater than 20°. What this can achieve is that a difference vector between the two illumination vectors of a pair of illumination directions 91 has a significant component perpendicular to the optical axis; this can increase the phase contrast in the phase-contrast image particularly strongly.

In particular, it may be possible for the illumination vectors of two illumination directions of a pair of illumination directions to be transformed into one another by rotation about the optical axis of the optical apparatus through an angle of greater than 25°, preferably greater than 50°, particularly preferably greater than 85°. As a result of this, the difference vector becomes particularly large.

The two illumination directions of a pair of illumination directions can also be arranged in such a way that associated illumination vectors include with one another, by way of rotation about the optical axis, an angle of 160° to 200°, advantageously of 175° to 185°, particularly advantageously of 180°. It would also be possible for the associated illumination vectors to be transformed into one another by way of rotation about the optical axis through an angle of 70° to 110°, advantageously of 85° to 95°, particularly advantageously of 90°. Expressed differently, the two illumination vectors of a pair of illumination directions 91 can lie in a plane and can be arranged symmetrically or substantially symmetrically in relation to the optical axis. The optical axis can lie in this plane (be contained in this plane), for example, if a rotation through 180° transforms the two illumination vectors into one another. In this way, a comparatively large phase-contrast component can be obtained in the phase-contrast image because the two illumination directions of a pair are arranged in complementary fashion to one another in this way.

In general, it may be desirable to use a relatively large number of illumination directions for the purpose of obtaining the phase-contrast image. In particular, the phase-contrast component in the phase-contrast image can increase in the case of an appropriate arrangement of the various illumination directions 91. By way of example, it would be possible to take account of a plurality of pairs of illumination directions. By way of example, it would be possible to illuminate the object sequentially from 2 or 4 or 6 or 8 illumination directions or more illumination directions. By way of example, it would be possible for a first pair of illumination directions to determine a first difference vector of associated illumination vectors. Accordingly, a second pair of illumination directions can determine a second difference vector of associated illumination vectors. The first and second difference vector can include an angle with one another, for example an angle of 70° to 110°, advantageously 85° to 95°, particularly advantageously 90°.

Accordingly, it would also be possible for a first plane to be defined by the illumination vectors of a first pair of illumination directions 91. By way of example, a second plane can be defined by the illumination vectors of a second pair of illumination directions. The first plane and the second plane can include an angle, for example an angle of 70° to 110°, with one another, advantageously 85° to 95°, particularly advantageously 90°. By way of example, the planes can be defined by virtue of the respective illumination vectors lying in the plane. It would also be possible for the planes to be defined by a normal vector that is oriented parallel to a difference vector of the respective illumination vectors; the optical axis can lie in the plane.

Thus, in this way, difference vectors of the illumination vectors of the two pairs of illumination directions 91 can include a comparatively large angle of up to 90° with one another; as a result, the phase-contrast in the phase-contrast image can be increased along various image directions. By way of example, a phase-contrast component in the phase-contrast image can be particularly large along those image directions for which the illumination vectors of a pair of illumination directions have a component perpendicular to the optical axis. In particular, a phase-contrast component in the phase-contrast image can be particularly large along those directions for which the difference vector of the illumination vectors of a pair of illumination directions has a component perpendicular to the optical axis. Therefore, it may be desirable to use complementary and/or symmetrically arranged illumination directions. In order to produce an isotropic phase contrast in the phase-contrast image, it may be desirable for the illumination directions to include uniformly distributed angles with the optical axis.

Such illumination directions 91, or illumination vectors as described above, can be implemented by suitable arrangement and/or extent of the light sources 111 on the carrier 101.

The above-described techniques can also be used to determine a position of a specimen object parallel to the optical axis of an optical apparatus (z-position). To this end, use can be made, in particular, of the different illumination modules described herein, which facilitate an illumination from different illumination directions.

In the three-dimensional space spanned by x, y, z-axes, the z-component of the position may thus be determined; the optical axis defines the z-axis and is e.g. parallel to the latter. On the basis of the z-position determined, e.g. a focus unit of the optical apparatus, for example a motor coupled to a specimen holder, may be driven and, in this way, the object may be positioned in the focal plane of the optical apparatus depending on the z-position determined (focusing of the object). Autofocus applications can be implemented. If no autofocus is present for the motor-driven adjustment of the focal plane but there is a manual adjustment unit instead, an indicator can be output to the user via a user interface, for example. This indicator can instruct the user to undertake a certain actuation of the adjustment unit in order thereby to facilitate focusing of the object. By way of example, the user interface can comprise an optical output and/or an acoustic output. By way of example, the direction of rotation of a setting dial of the adjustment unit could be indicated.

Images of the object which image the object particularly sharply may subsequently be captured. Such techniques may be employed in a wide variety of fields, e.g. in microscopy or in fluorescence measurement or in parallel with phase contrast imaging.

By means of the techniques described herein, it may be possible, in particular, to facilitate particularly fast focusing. To this end, it may be possible for the illumination of the specimen object from different illumination directions to occur at least partly parallel in time. To this end, it would be possible, for example, to carry out the illumination from different illumination directions by means of light with different wavelengths or colors or polarizations. In this way, it is possible to separate the signals that correspond to the different illumination directions.

For the exemplary application of the fluorescence measurement, it may be possible, for example, to determine the z-position before and/or during the fluorescence measurement by means of the techniques described below. It may thus be ensured that the fluorescing object is situated in the focal plane of the optical apparatus during the measurement; in this way, it is possible to increase an accuracy during the fluorescence measurement. The techniques described in detail below are based on evaluating a first image and a second image with illumination of the object from different first and second illumination directions. In this case, this angle-selective illumination may be carried out e.g. in particular with one or more wavelengths that are outside the fluorescence-active range of the fluorescing specimen. In principle, the z-position may thus be determined at the same time as the fluorescence measurement. This may make it possible, for example, in particular, to position moving specimens as a function of time reliably in the focal plane. Furthermore, the z-position may generally be determined from only two illumination processes; by this means, too, it is possible to reduce a light-toxic effect on the fluorescing object. When measuring dyes, the wavelength of the light for determining the z-position may be chosen e.g. outside the excitation range of the dyes. In this way, bleaching of the dyes may be reduced or avoided. One possible light wavelength which is used for determining the z-position would be e.g. in the infrared range.

Determining the z-position may mean in this case: quantitatively determining the z-position, e.g. in relation to the focal plane or in relation to some other suitable reference system of the optical apparatus; and/or qualitatively determining the z-position, e.g. in relation to the criterion of whether or not a specific predefined position parallel to the optical axis, such as e.g. the focal plane, is attained.

Figure 20:
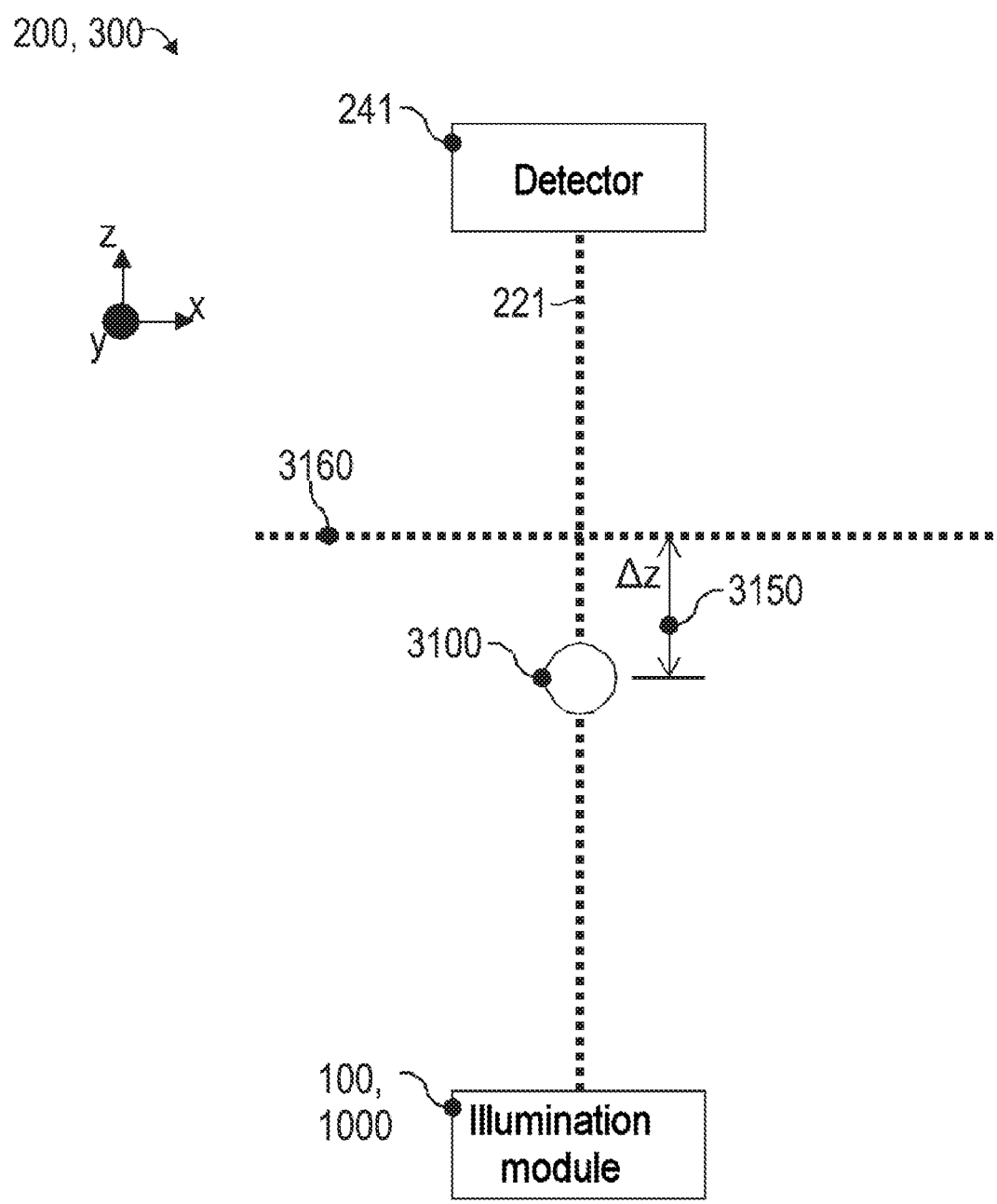
FIG. 20 schematically illustrates the arrangement of a specimen object outside of a focal plane of an optical apparatus.

FIG. 20 schematically illustrates an optical apparatus 200, 300, e.g., a microscope or an LSM. A beam path of the light extends from an illumination module 100, 1000 to a detector 241. The illumination module 100, 1000 can be implemented in a manner corresponding to the examples described above, i.e., for example, with a carrier and a plurality of light sources arranged on the carrier.

The optical axis 221 and the focal plane 3160 are illustrated in FIG. 20. It is evident from FIG. 20 that the specimen object 3100 is positioned parallel to the optical axis 221 outside the focal plane 3160. The illustration shows a z-position 3150 which is measured in relation to the focal plane 3160 (denoted by Δz in FIG. 20). In such a case, it may be possible particularly simply and rapidly to drive the focus unit of the optical apparatus 200, 300 in order to carry out a focusing. In particular, it may be unnecessary to carry out e.g. a transformation of the z-position 3150 in relation to the focal plane 3160. It would also be possible to determine the position of the object 3100 in some other suitable reference coordinate system of the optical apparatus.

Figure 21:
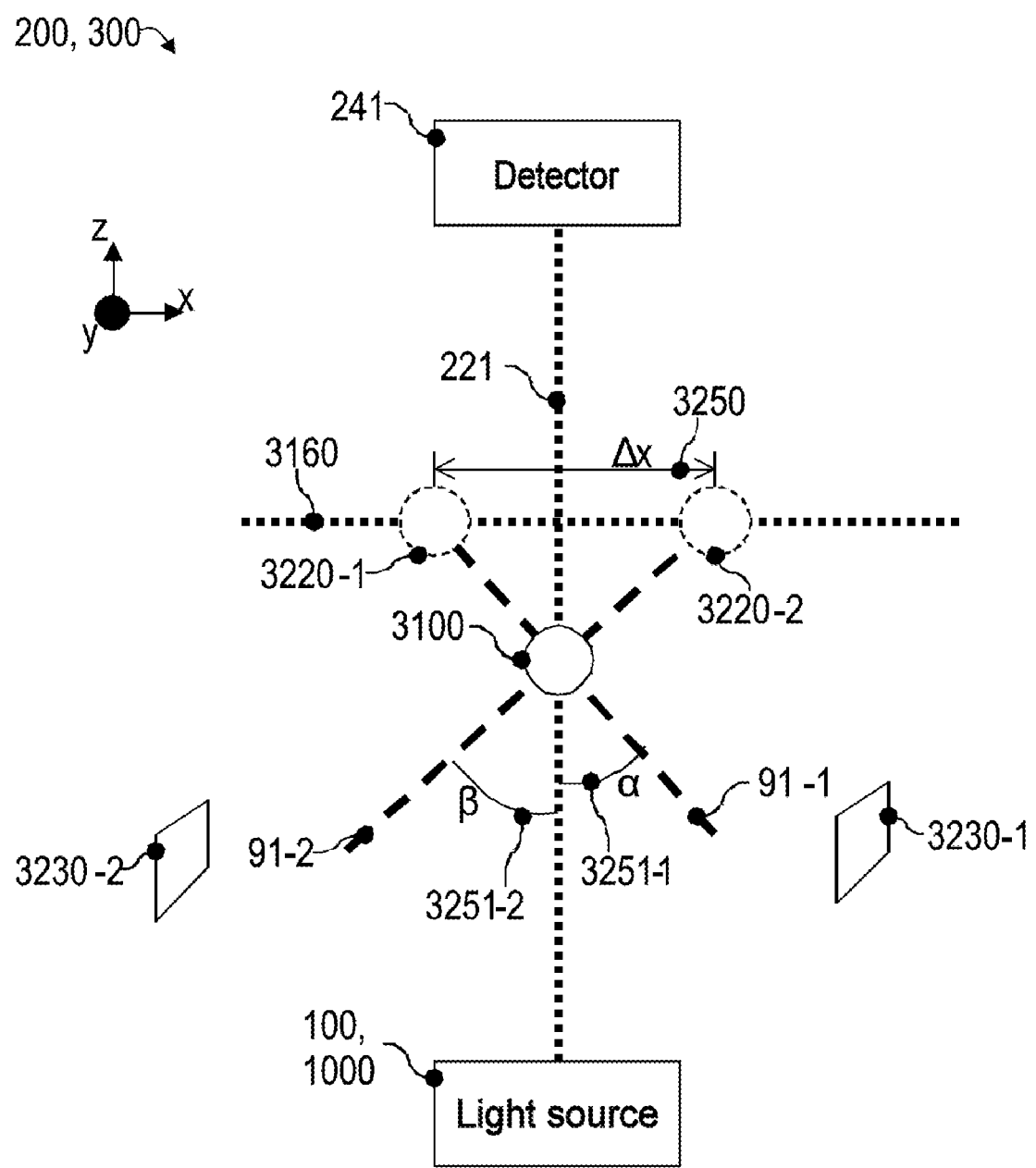
FIG. 21 schematically illustrates the determination of the z-position of the specimen object in the scenario of FIG. 20.

A first illumination direction 91-1 and a second illumination direction 91-2 are furthermore illustrated in FIG. 21. A first image 3230-1 is captured for the first illumination direction 91-1. A second image 3230-2 is captured for the second illumination direction 91-2. As is evident from FIG. 21, the first illumination direction 91-1 includes a first angle 3251-1 with the optical axis 221. Therefore, an imaging location 3220-1 of the object 3100 in the first image 3230-1 in accordance with FIG. 21 appears offset toward the left relative to the optical axis 221. In FIG. 21, the first angle 3251-1 is denoted by α. As is furthermore evident from FIG. 21, the imaging location 3220-2 of the object 3100 in the second image 3230-2 in the illustration in FIG. 21 is offset toward the right relative to the optical axis 221. This is the case on account of the second angle 3251-2 (denoted by β in FIG. 21) included between the second illumination direction 91-2 and the optical axis 221. By way of example, it would be possible for the two illumination directions 91-1, 91-2 to be associated with different colors or polarizations of the respectively employed light.

It is evident from FIG. 21 that an absolute value of the first angle 3251-1 differs from an absolute value of the second angle 3251-2. In general, it would be possible for the first and second illumination directions 91-1, 91-2 to be arranged symmetrically in relation to the optical axis 221. It would e.g. also be possible for one of the two illumination directions 91-1, 91-2 to be oriented parallel to the optical axis 221. In general, it is also possible for the specimen object 3100 to have an offset relative to the optical axis 221, i.e., to be displaced within an xy-plane relative to the optical axis 221. In general, it is furthermore not necessary for the first illumination direction 91-1, the second illumination direction 91-2 and the optical axis 221 to lie in one plane (in the xz-plane in the scenario in FIG. 21). This means that e.g. the first illumination direction 91-1 and/or the second illumination direction 91-2 may be tilted out of the xy-plane.

Instead of the sharply delimited illumination directions 91-1, 91-2, it is also possible to use illumination directions that implement the illumination of the specimen object 3100 over a certain solid angle. To this end, more than two light sources, for example, could be used to implement a single illumination direction or else a light source with a large extent in relation to the specimen object 3100 could be used.

Since the object 3100 is illuminated with finite angles 3251-1, 3251-2 relative to the optical axis 221, a pure phase object which brings about no or only a small attenuation of the amplitude of the light passing through may also be imaged in the first and second images 3230-1, 3230-2. This enables a diverse application of the present techniques to different specimens, in particular, e.g., biological specimens.

FIG. 21 furthermore illustrates a distance 3250 between the imaging locations 3220-1, 3220-2 of the object 3100 in the first and second images 3230-1, 3230-2 (designated by Δx in FIG. 21). Initially, it is possible to qualitatively determine that the distance 3250 does not disappear. In this way, the z-position 3150 may already be determined qualitatively as not equal to zero. By way of example, it would be possible, by iteratively repositioning the object 3100 at different reference positions (not shown in FIG. 21) parallel to the optical axis 221, to determine the z-position 3150 qualitatively as equal or near to zero. For this purpose, the specimen object 3100 could, for instance, be repositioned iteratively parallel to the optical axis 221 until the distance 3250 is minimized. A corresponding control loop could be implemented.

However, it would also be possible for determining the z-position 3150 furthermore to be based on the first angle 3251-1 and the second angle 3251-2. The z-position 3150 may then be determined quantitatively. For this purpose, as set out below, trigonometrical relationships between the first angle 3251-1, the second angle 3251-2 and the distance 3250 may be taken into account.

The following applies to the scenario of FIG. 21:

$$\Delta z = a \cdot \cos \alpha = b \cdot \cos \beta \quad (1)$$

where a denotes a distance between the specimen object 3100 and the imaging location 3220-1 of the object 3100 in the first image 3230-1 along the first illumination direction 91-1 and b denotes a distance between the specimen object 3100 and the imaging location 3220-2 of the object 3100 in the second image 3230-2 along the second illumination direction 91-2 (a and b are not illustrated in FIG. 21). This formula results from the definition of the cosine for right-angled triangles.

By applying the sine law for general triangles, the following is obtained:

$$\frac{\Delta x}{\sin(\alpha + \beta)} = \frac{b}{\sin(90° - \alpha)} = \frac{b}{\cos \alpha}. \quad (2)$$

Combining equations 1 and 2 results in:

$$\Delta z = \Delta x \cdot \frac{\cos \alpha \cos \beta}{\sin(\alpha + \beta)}. \quad (3)$$

With the aid of equation 3, it is possible to determine the z-position 3150 on the basis of the first angle 3251-1 and the second angle 3251-2 and furthermore on the basis of the distance 3250 between the imaging locations 3220-1, 3220-2. In particular, the z-position 3150 may be determined solely by double illumination and simultaneous capture of the first and second images 3230-1, 3230-2. A light loading of the object 3100 may be minimized, e.g. in comparison with the abovementioned scenario with iterative positioning of the object 3100 at different reference positions parallel to the optical axis 221.

It may be desirable to increase an accuracy for determining the z-position 3150. The accuracy for determining the z-position 3150 is typically associated directly with the first angle 3251-1, the second angle 3251-2 and the distance 3250. Therefore, the accuracy when determining the z-position 3150 may be limited at least by a pixel size in the first image 3230-1 and the second image 3230-2.

An error in the distance 3250—designated as Δx' hereinafter—is transferred as follows to an error of the z-position 3150:

$$\Delta z' = \Delta x' \cdot \frac{\cos \alpha \cos \beta}{\sin(\alpha + \beta)}. \quad (4)$$

If the specimen object 3100 has a significant extent in the xy-plane, it may be desirable, e.g. to determine the distance 3250 between specific reference points in the first image 3230-1 and the second image 3230-2. The reference points may mark a specific part of the object 3100, e.g. a particularly prominent part or a part that is particularly important for the imaging. In general, it is also possible to determine the distance 3250 for a plurality of pairs of reference points of the object 3100. In this way, it may be possible, by repeatedly applying equation 3, for different parts of the object 3100, to determine the z-position 3150 in each case. In other words, the z-position 3150 can thus be determined in a spatially resolved manner in the xy-plane.

It may thus be desirable to determine the distance 3250 particularly accurately. In this context it may be possible to apply a wide variety of techniques which enable the distance 3250 to be determined particularly accurately. Such techniques may include e.g.: landmark recognition; determining an optical centroid of the object 3100 in the first image 3230-1 and/or in the second image 3230-2; a user input; an aberration correction. In one simple scenario, e.g. the user could select a specific reference point of the object 3100 in the first image 3230-1 and select the corresponding reference point in the second image 3230-2. By means of landmark recognition, it may be possible, for example, to carry out such a selection of reference points in an at least partly automated manner. It would also be possible to use the optical centroid as a reference point for determining the distance 3250. The aberration correction may be used e.g. to take account of known incorrect imagings on account of aberrations in the optical apparatus 200, 300. By way of example, it may be possible, by taking account of previously known aberrations, e.g., in the illumination apparatus of the optical apparatus and/or in the detector optical unit of the optical apparatus, to take account of distortions in the first and second images that may lead to a displacement of the imaging locations of the object. Such displacements may then be eliminated computationally or reduced computationally and the actual distance may be determined particularly accurately.

A further limitation of the accuracy when determining the z-position 3150 may result from the coherent depth of field of the detector 241 of the optical apparatus 200, 300. In particular, it should be ensured that the specimen object 3100—even in the case of a significant displacement relative to the focal plane 3160—is still imaged in the first image 3230-1 and the second image 3230-2. However, it may be unnecessary to achieve a sharp imaging of the object 3100; in particular techniques described above, such as e.g. the determination of the optical centroid of the object 3100, may also be applied in a case in which the specimen object 3100 is imaged only unsharply in the images 3230-1, 3230-2.

While FIGS. 20 and 21 show a situation in which the specimen object 3100 is positioned along the optical axis 221, that is to say that it intersects the optical axis 221, the techniques described above may also be used to determine the z-position for such scenarios in which the specimen object 3100 has a specific offset parallel to the x-direction and/or parallel to the y-direction relative to the optical axis 221. In general terms, the above-described techniques for determining the position 3150 of the object parallel to the optical axis 221 may thus enable the determination of the z-component of the position of the object 3100 in the three-dimensional space spanned by the x, y, z-axes.

FIG. 21 furthermore shows a situation in which two illumination directions 91-1, 91-2 are used for determining the z-position. In general, it is also possible to use a greater number of illumination directions 91-1, 91-2 for determining the z-position 3150 of the object 3100. By way of example, three or four or ten or more illumination directions 91-1, 91-2 may be used. It would be possible, for example, for the different illumination directions 91-1, 91-2, to apply the abovementioned techniques in each case in pairs, e.g. to apply equation 3 in each case in pairs. In this way, e.g. the z-position 3150 of the object 3100 may be determined multiply and a suitable average value may be formed therefrom. In this way, it may be possible, for example, to determine the z-position 3150 of the object 3100 particularly accurately. In general, it is possible to use a wide variety of techniques for combining a larger data set consisting of imaging locations 3220-1, 3220-2 of a plurality of illumination directions 91-1, 91-2. By way of example, equation 3 could be suitably modified or a plurality of z-positions obtained from the different illumination directions 91-1, 91-2 could be consolidated after multiple application of equation 3. In other words, by means of a plurality of illumination directions 91-1, 91-2 or redundant illumination directions 91-1, 91-, it may be possible to achieve a higher accuracy when determining the z-position 3150; it is possible, for example, in particular, to achieve an accuracy which is higher than a resolution of corresponding images from which the imaging locations 3220-1, 3220-2 are determined.

Here it is possible for the first light used to illuminate the specimen object 3100 from the first illumination direction and the second light used to illuminate the specimen object 3100 from the second illumination direction or, in general, for the light of the different used illumination directions to differ from one another. This means that the first light may have different wavelengths than the second light. As an alternative or in addition thereto, the first light could have a different polarization than the second light. As a result, it is possible for the illumination of the specimen object 3100 from the first illumination direction and the illumination of the specimen object 3100 from the second illumination direction to occur at least partly parallel in time. As a result, particularly fast autofocusing of the specimen object 3100 may be facilitated. Such techniques may also be applied to more than two illumination directions.

By way of example, two detectors could be provided for separating the first light and the second light, said detectors each being associated with a filter that is configured according to the properties of the respective light. Thus, the filters can implement a spectral element that facilitates filtering or separation of the light in respect of its spectral properties. By way of example, the spectral element may be selected from the following group: beam splitter; dichroic element; color filter; polarization filter; filter wheel; and prism. It would also be possible for a detector to be used, said detector having different groups of pixels, which each have different sensitivities in relation to wavelengths and/or polarizations of light.

Figure 22:
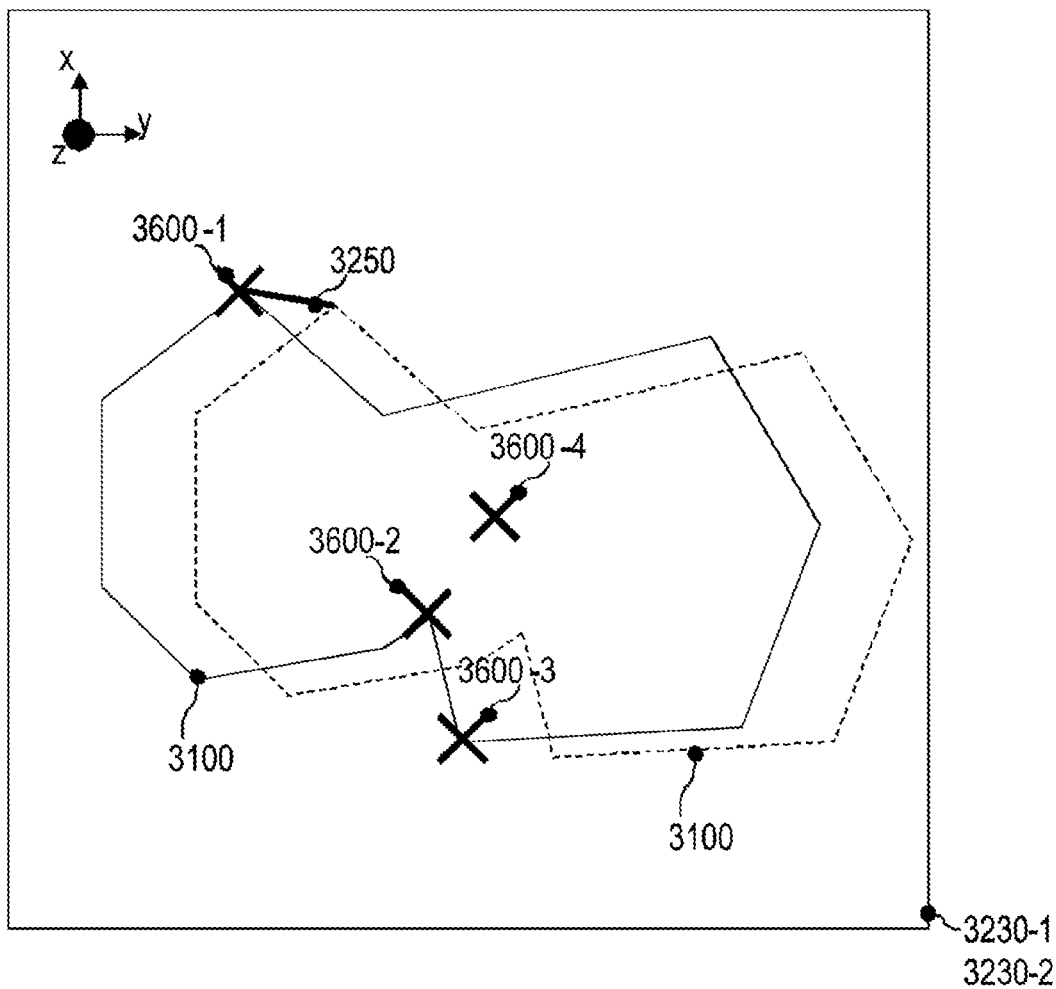
FIG. 22 schematically illustrates the distance between reference points of a specimen object for illumination from different illumination directions.

FIG. 22 schematically illustrates an imaging of specimen object 3100 in the first image 3230-1 (shown by a solid line in FIG. 22) and in the second image 3230-2 (shown by a dashed line in FIG. 22). The specimen object 3100 has a significant extent in the xy-plane, i.e., perpendicular to the optical axis 221. The illustration shows three possible reference points 3600-1, 3600-2, 3600-3, 3600-4 for the imaging of the object 3100 in the first image 3230-1. In principle, the choice of the reference points 3600-1-3600-4 is not particularly restricted. However, the reference points 3600-1-3600-4 illustrated in FIG. 22 may be found particularly reliably in the first and second images 3230-1, 3230-1. By way of example, the distance 3250 could be determined between the first reference point 3600-1 (see FIG. 22), since this is the highest point of the object 3100 in the images 3230-1, 3230-2 and can thus be found easily and reliably. The reference point 3600-4 denotes e.g. the optical centroid of the object 3100 in the images 3230-1, 3230-2.

By way of example, the distance 3250 could be determined with the aid of an image correlation calculation and a search for maximum within the image correlation: In some examples, the position of this maximum can directly determine the value of dx; see equation 3. In order to increase the robustness, it is also possible to use a threshold on the correlation image: in this way, it is possible to span an area in which the centroid is then sought after. The position of the centroid can also then determine dx directly. Such a technique can be advantageous, in particular, if the object comprises a plurality of planes.

Figure 23:
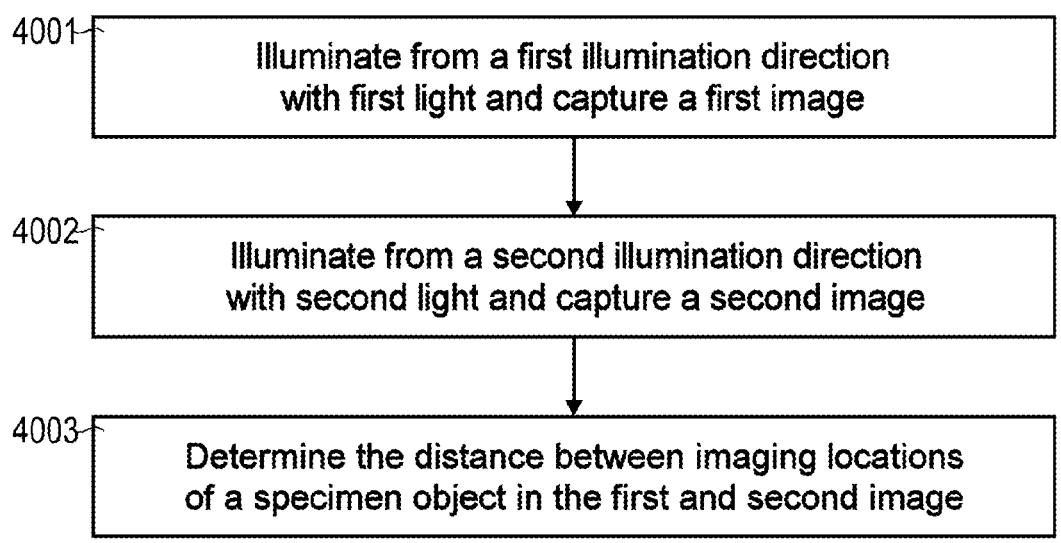
FIG. 23 is a flowchart of a method according to various embodiments.

FIG. 23 is a flowchart of a method according to various embodiments. The specimen object is illuminated from a first illumination direction in step 4001. A corresponding first image is captured. The specimen object is then illuminated from a second illumination direction in step 4002. Once again, a corresponding second image is captured.

By way of example, for the purposes of illuminating the specimen object, it would be possible to use an illumination module having a plurality of light sources and, for example, a light-transmissive region according to various examples described herein.

By way of example, it would be possible for steps 4001, 4002 to be carried out at least partly parallel in time. By way of example, it would be possible for 4001, 4002 to be carried out in parallel in time as a single-shot measurement. To this end, respectively different light can be used in steps 4001 and 4002, i.e., light that differs in respect of at least one spectral property such as wavelength and/or polarization, for example.

Figure 24:
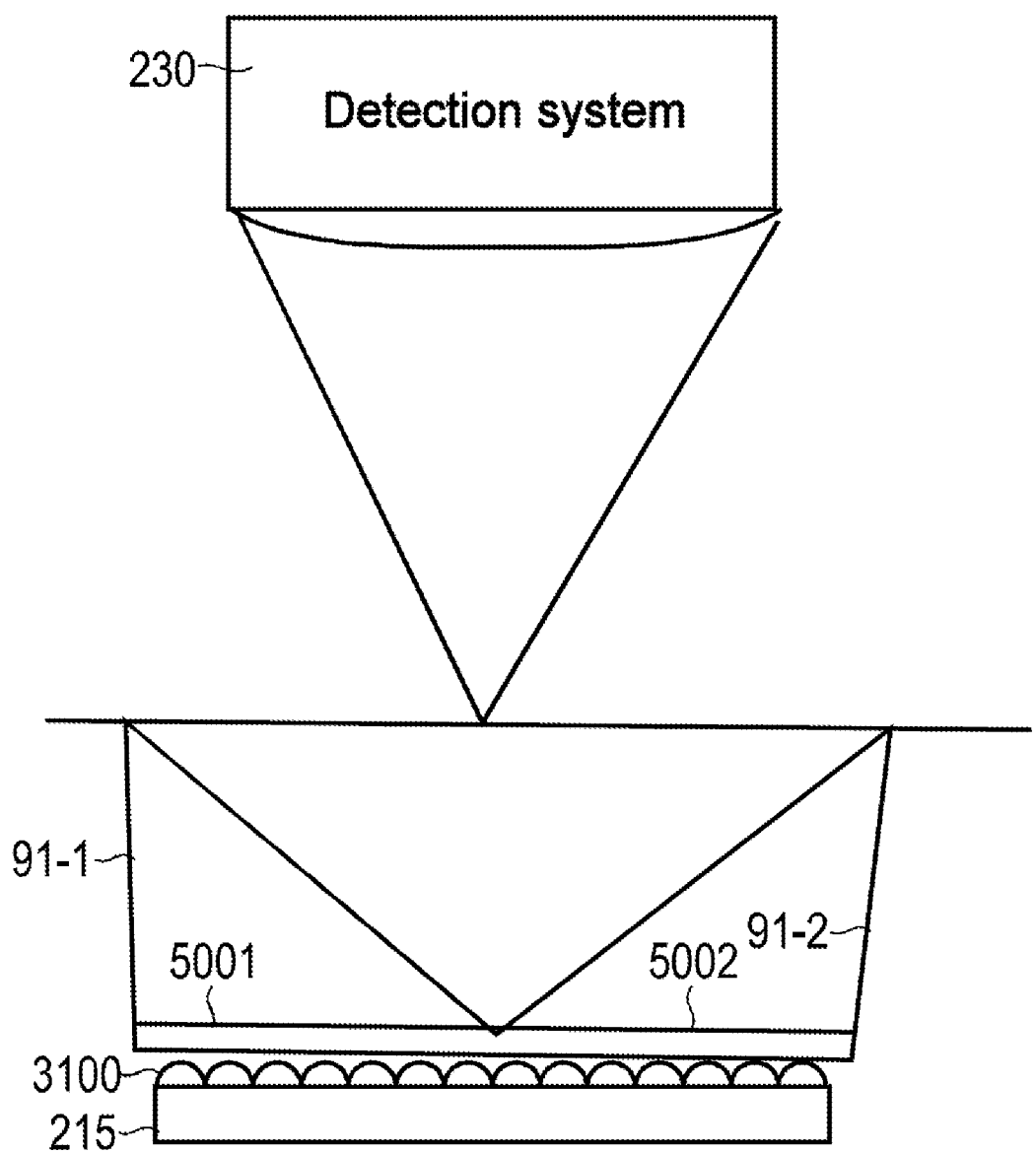
FIG. 24 schematically illustrates the illumination of a specimen object from a plurality of illumination directions with light of different wavelengths and/or polarizations.
Figure 25:
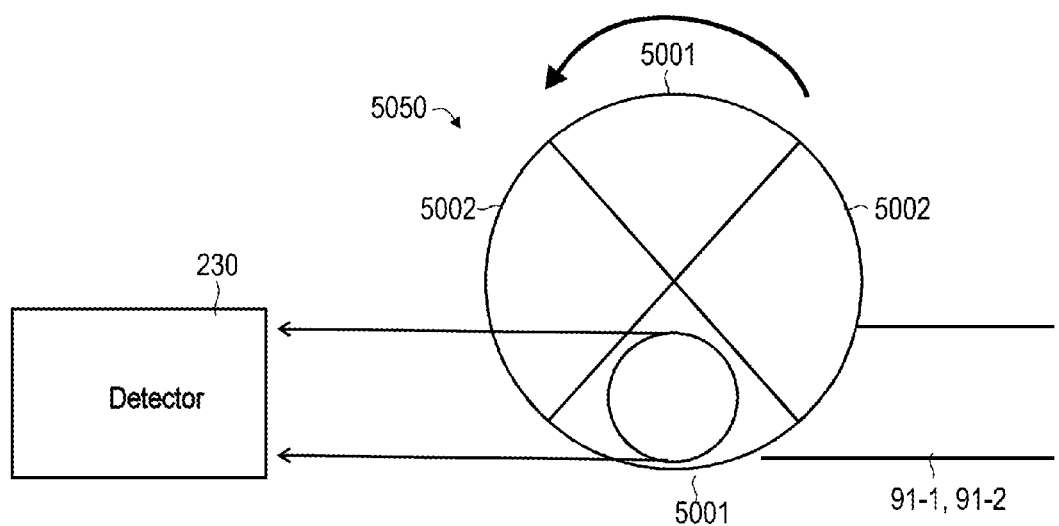
FIG. 25 schematically illustrates the illumination of a specimen object from a plurality of illumination directions with light of different wavelengths and/or polarizations.
Figure 26:
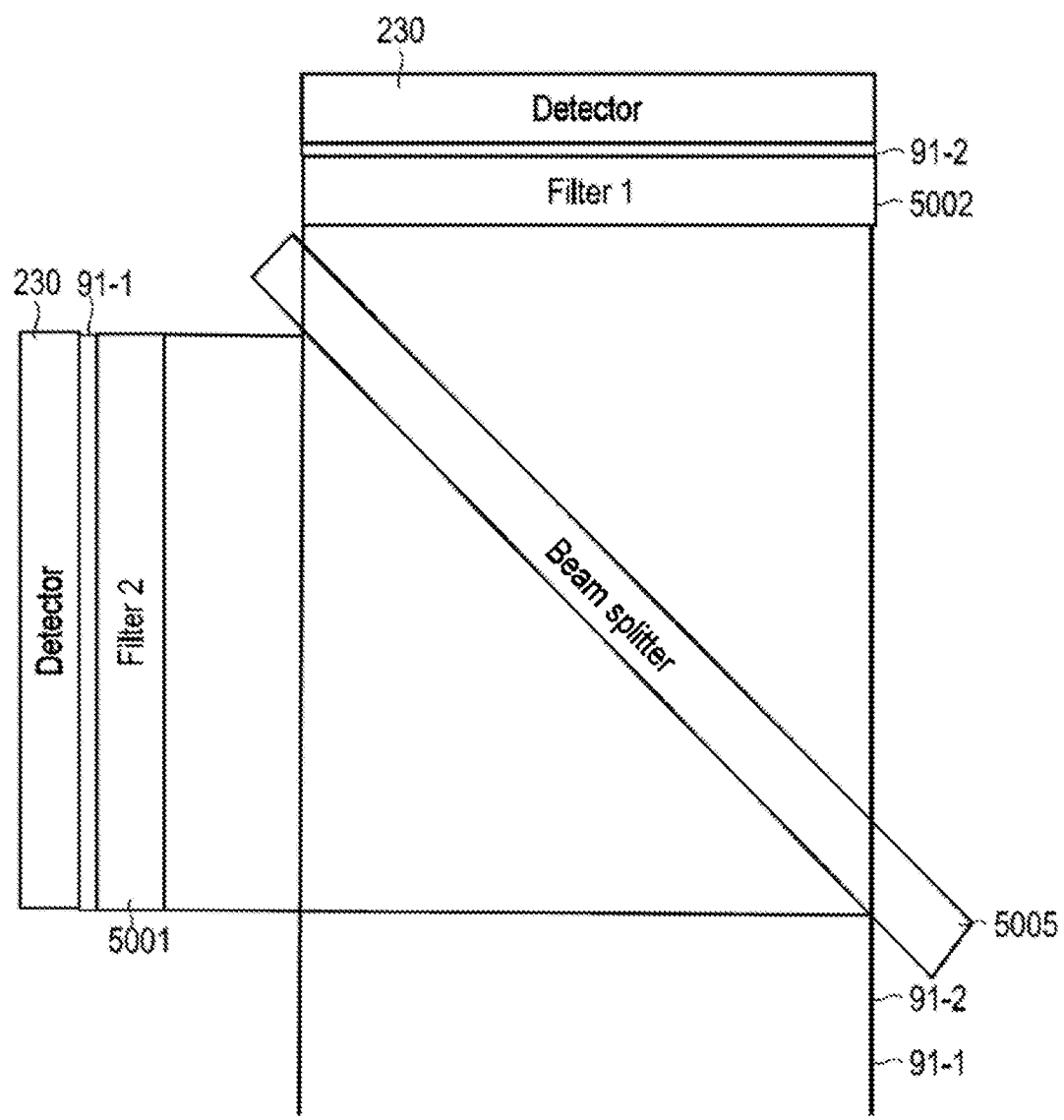
FIG. 26 schematically illustrates the illumination of a specimen object from a plurality of illumination directions with light of different wavelengths and/or polarizations.

In order to facilitate a separation of the light to capture the first image and the second image, use can then be made of a spectral element with a plurality of detectors or with a detector having a plurality of groups of pixels that are associated with the different spectral properties of the light. FIG. 24 shows an exemplary implementation in which respectively different color or polarization filters 5001, 5002 are associated with the two illumination directions 91-1, 91-2. FIG. 25 shows an exemplary implementation in which different color or polarization filters 5001, 5002 are arranged in a filter wheel 5050. FIG. 26 shows an exemplary implementation in which different color or polarization filters 5001, 5002 are associated with different detectors 230.

Referring back to FIG. 23: The distance between imaging locations of the specimen object in the first and second image is determined in step 4003. By way of example, these imaging locations can be identified on the basis of landmarks.

On the basis of the determined distance, it is then possible, for example, to determine the z-position of the specimen object, i.e., the distance to the focal plane. As an alternative or in addition thereto, it is also possible to implement an autofocus application, in which, for example, the motor of a specimen holder is actuated for focusing purposes.

To summarize, a description has been given above of techniques which—e.g., by applying equation 3 or by repositioning the object parallel to the optical axis—enable the z-position 3150 to be determined particularly rapidly and accurately. A rapid focusing of the object 3100 becomes possible as a result.

In conclusion, techniques in relation to illumination modules for angle-selective illumination were described above. Such techniques render it possible to combine the angle-selective illumination flexibly with various optical apparatuses.

It goes without saying that the features of the embodiments and aspects of the invention described above can be combined with one another. In particular, the features can be used not only in the combinations described but also in other combinations or on their own without departing from the scope of the invention.

While various examples were described above in relation to an LSM and in relation to a microscope with an eyepiece, it is also possible to use corresponding techniques for other optical apparatuses in other examples. In particular, the illumination modules with carrier and light-transmissive region, as described herein, can also be used for other optical apparatuses.

While various examples were described above in relation to fluorescence imaging, corresponding techniques can also be used for other types of imaging. This may mean that use can be made of other detectors which, for example, are not suitable for detecting a fluorescence signal.

While various examples were described above in relation to an illumination module with a carrier, which has a light-transmissive region, corresponding techniques can also be applied to a carrier that has no light-transmissive region in some examples.

The invention claimed is:

1. A microscope comprising:
   an illumination module comprising a carrier and a plurality of light sources, which are arranged on the carrier, wherein the plurality of light sources are configured to be actuated separately for light production purposes,
   a computing unit, which is configured to actuate the illumination module for the purposes of illuminating a specimen object from a first illumination direction with first light and to capture a first image during the illumination from the first illumination direction by means of at least one detector,
      wherein the computing unit is furthermore configured to actuate the illumination module for the purposes of illuminating the specimen object from a second illumination direction with second light and to capture a second image during the illumination from the second illumination direction by means of the at least one detector,
      wherein the computing unit is furthermore configured to determine a distance between imaging locations of the specimen object in the first image and in the second image,
      wherein the first light and the second light have different wavelengths and/or polarizations, and
      wherein the illumination of the specimen object from the first illumination direction and the second illumination direction, at least in part, occurs parallel in time.

2. The microscope as claimed in claim 1,
   wherein the computing unit is furthermore configured to determine a position of the specimen object parallel to the optical axis on the basis of the distance between the imaging locations of the specimen object in the first image and in the second image.

3. The microscope as claimed in claim 1, furthermore comprising:
   a specimen holder, which is configured to immobilize the specimen object,
   a motor, which is configured to displace a focal plane of the microscope in relation to the specimen holder,
      wherein the computing unit is configured to actuate the motor on the basis of the determined distance between the imaging locations of the specimen object in the first image and the second image.

4. The microscope as claimed in claim 1, furthermore comprising:
   a specimen holder, which is configured to immobilize the specimen object,
   a manual adjustment unit, which is configured to displace a focal plane of the microscope in relation to the specimen holder,
   a user interface, which is configured to output an indicator to a user, said indicator proposing an actuation of the adjustment unit on the basis of the distance between the imaging locations of the specimen object in the first image and the second image.

5. The microscope as claimed in claim 1, furthermore comprising:
   the at least one detector, which comprises a plurality of groups of pixels, which each have different sensitivities in relation to wavelengths and/or polarizations of light.

6. The microscope as claimed in claim 1, furthermore comprising:
  a plurality of detectors,
  at least one spectral element, which is configured to produce a plurality of partial beam paths, assigned to the detectors, on the basis of a separation of light in relation to wavelengths and/or polarizations.

7. The microscope as claimed in claim 6,
  wherein the at least one spectral element is selected from the following group: beam splitter; dichroic element; color filter; polarization filter; grating; filter wheel; and prism.

8. A method, comprising:
  illuminating a specimen object from a first illumination direction with first light and capturing a first image during the illumination from the first illumination direction,
  illuminating the specimen object from a second illumination direction with second light and capturing a second image during the illumination from the second illumination direction, and
  determining a distance between imaging locations of the specimen object in the first image and in the second image,
  wherein the first light and the second light have different wavelengths and/or polarizations, and
  wherein the illumination of the specimen object from the first illumination direction and the second illumination direction, at least in part, occurs parallel in time.

* * * * *

UNITED STATES PATENT AND TRADEMARK OFFICE
CERTIFICATE OF CORRECTION

Page 1 of 2

PATENT NO. : 11,092,794 B2
APPLICATION NO. : 16/098154
DATED : August 17, 2021
INVENTOR(S) : L. Stoppe et al.

It is certified that error appears in the above-identified patent and that said Letters Patent is hereby corrected as shown below:

In the Specification

Column 5, Line 45, please change "on optical" to -- an optical --.

Column 15, Line 14, please change "configuration" to -- configurations --.

Column 17, Line 47, please change "carrier 110" to -- carrier 101 --.

Column 17, Line 66, please change "carrier 110" to -- carrier 101 --.

Column 18, Line 30, please change "beam path 221" to -- beam path 261 --.

Column 18, Line 37, please change "illustrate" to -- illustrates --.

Column 21, Line 35, please change "camera 311" to -- camera 310 --.

Column 21, Line 38, please change "camera 311" to -- camera 310 --.

Column 21, Line 40, please change "camera 311" to -- camera 310 --.

Column 21, Line 42, please change "10" to -- 10A --.

Column 22, Line 28, please change "with" to -- with a --.

Column 23, Line 56, please change "carrier 110" to -- carrier 101 --.

Column 23, Line 58, please change "carrier 110" to -- carrier 101 --.

Column 23, Line 60, please change "carrier 110" to -- carrier 101 --.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*

Column 23, Line 61, please change "carrier 110" to -- carrier 101 --.

Column 24, Line 50, please change "2003" to -- 2005 --.

Column 32, Line 42, please change "3230-1, 3230-1" to -- 3230-1, 3230-2 --.